(12) United States Patent
Murphy et al.

(10) Patent No.: US 10,817,128 B2
(45) Date of Patent: Oct. 27, 2020

(54) INPUT DEVICE FOR VR/AR APPLICATIONS

(71) Applicant: Logitech Europe S.A., Lausanne (CH)

(72) Inventors: Padraig Murphy, Co. Monogham (IE); Andreas Connellan, Dublin (IE); Olivier Riviere, Co. Cork (IE); Fergal Corcoran, Co. Cork (IE); Pierce O'Bradaigh, Co. Cork (IE); Jan Findlater, Co. Cork (IE); Philip Waldron, Co. Cork (IE); Gavin McGlynn, Co. Cork (IE); Denis O'Keefe, Co. Cork (IE); Jerry Ahern, Ballincollig Cork (IE); Marcel Twohig, Dublin (IE)

(73) Assignee: Logitech Europe S.A., Lausanne (CH)

( * ) Notice: Subject to any disclaimer, the term of this patent is extended or adjusted under 35 U.S.C. 154(b) by 51 days.

(21) Appl. No.: 15/786,614

(22) Filed: Oct. 18, 2017

(65) Prior Publication Data

US 2019/0018567 A1   Jan. 17, 2019

Related U.S. Application Data

(60) Provisional application No. 62/531,332, filed on Jul. 11, 2017.

(51) Int. Cl.
*G06F 3/0481* (2013.01)
*G06F 3/0346* (2013.01)
(Continued)

(52) U.S. Cl.
CPC ....... *G06F 3/04815* (2013.01); *G02B 27/017* (2013.01); *G06F 3/011* (2013.01);
(Continued)

(58) Field of Classification Search
CPC .... G06F 3/04815; G06F 3/012; G06F 3/0346; G06F 3/011; G06F 3/04883;
(Continued)

(56) References Cited

U.S. PATENT DOCUMENTS

2010/0113153 A1* 5/2010 Yen .......................... A63F 13/06
463/37
2017/0024035 A1* 1/2017 Pelis ....................... G06F 3/044
(Continued)

*Primary Examiner* — Abhishek Sarma
(74) *Attorney, Agent, or Firm* — Kilpatrick Townsend & Stockton LLP

(57) ABSTRACT

In some embodiments, an input device for interfacing within an VR/AR environment can include a processor, one or more motion tracking sensors to track a motion of the input device in three-dimensional (3D) space, where a cursor in the VR/AR environment moves based on the tracked motion of the input device in 3D space and is limited to tracked motion having three degrees of freedom (DOF). The input device can further include a button that, when activated, selects an application window in the VR/AR environment when the cursor is placed over the application window, where the application window moves in the VR/AR environment based on the tracked motion of the input device in 3D space while the application window is selected. The input device can include a user interface that, when activated, accesses and controls content on the selected application window.

6 Claims, 12 Drawing Sheets

(51) Int. Cl.
*G06T 19/00* (2011.01)
*G06F 3/01* (2006.01)
*G06F 3/0488* (2013.01)
*G02B 27/01* (2006.01)

(52) U.S. Cl.
CPC ............ *G06F 3/012* (2013.01); *G06F 3/0346* (2013.01); *G06F 3/04883* (2013.01); *G06T 19/006* (2013.01)

(58) Field of Classification Search
CPC .......... G02B 27/017; G02B 2027/0187; G02B 2027/014; G06T 19/006
See application file for complete search history.

(56) References Cited

U.S. PATENT DOCUMENTS

| | | | |
|---|---|---|---|
| 2017/0060230 A1* | 3/2017 | Faaborg | G06F 3/011 |
| 2017/0153709 A1* | 6/2017 | Kondo | A63F 13/213 |
| 2017/0330387 A1* | 11/2017 | Dearman | G06T 19/20 |
| 2017/0336882 A1* | 11/2017 | Tome | G06F 3/011 |
| 2019/0034076 A1* | 1/2019 | Vinayak | G06F 3/017 |

* cited by examiner

Translation and Rotation via Both IMU and Touch

INPUT DEVICE FOR VR/AR APPLICATIONS

CROSS-REFERENCES TO RELATED APPLICATIONS

This present application claims priority to U.S. Patent Application No. 62/531,332 filed Aug. 11, 2017 entitled "Input Device for VR/AR Applications," which is herein incorporated by reference in its entirety for all purposes.

BACKGROUND

Virtual Reality (VR) may be referred to as immersive multimedia or computer-simulated reality. It is frequently associated with a variety of applications, which may comprise immersive, highly visual, computer-simulated environments. These environments typically simulate a physical presence of a user in places in a real world or an imagined world. The computer simulation of these environments can include visual images, which are presented by means of a graphical display. Typically, the display is arranged as a head mounted display (HMD) and may encompass all or part of a user's field of view. Examples of HMDs presently available are the Oculus Rift™, HTC Vive™, Samsung Gear VR™, and the HoloLens™ from Microsoft™.

Augmented reality (AR) or mixed reality (MR), on the other hand, can superimpose virtual images on a real world environment, or otherwise combine them. A well-known example is Google Glass™ where a display is projected on an HMD worn by a user, while still allowing the user to see the real world. A touchpad on the side of the Google Glass™ HMD provides control of the display. Another technology is retinal projection, where a small projector mounted on an HMD can project a display directly onto a retina of a user's eye, while allowing the user to see the real world at the same time.

Some VR/AR systems incorporate hand-held user input devices. Some hand-held user input devices can track movement in the VR/AR environment in six degrees of freedom (DOF), including, for example, translational motion along the x, y, and z planes in a Cartesian coordinate system, as well as a rotation around the x, y, and z planes (e.g., pitch, roll, and yaw). Such systems typically require lighthouses or other external tracking sensors to track and correlate movement to reduce drift, which can be a problem in VR/AR input devices. In some conventional systems, three DOF motion-tracked input devices can be used, which may eliminate the need for external tracking sensors, but can lack the level of control of the six DOF counterparts. Despite the many advancements in VR/AR technology, and particularly in their corresponding input devices, further improvements are desirable.

BRIEF SUMMARY

In certain embodiments, a system includes an input device for interfacing within a virtual reality or augmented reality (VR/AR) environment, the input device comprising an inertial motion unit (IMU) configured to track a motion of the input device in three-dimensional (3D) space, a button, and an input interface. The system further including a non-transitory computer-readable media storing instructions that, when executed by a processor, configures the processor to control movement of a cursor in the VR/AR environment based on the tracked motion of the input device in 3D space, wherein the movement of the cursor is limited to tracked movement of the input device in three degrees of freedom (3-DOF). In response to a position of the cursor in relation to a virtual object and actuation of the button, the instructions further include selecting the virtual object. While the virtual object is selected, the instructions can further include moving the virtual object in the VR/AR environment based on the 3-DOF tracked motion of the input device, and while the virtual object is selected, the instructions can include controlling movement of the virtual object in the VR/AR environment in one or more additional DOF based on a user input detected via the input interface. The input interface can include a touch-sensitive region, and the button and input interface can be configured for independent and simultaneous operation. In some cases, the 3-DOF motion tracking, the button, and the input interface are operable, in combination, to manipulate a virtual object in the VR/AR environment in 6-DOF including movement along an x-axis, a y-axis, a z-axis, yaw, pitch, and roll.

In some embodiments, a computer-implemented method for operating an input device in a VR/AR environment includes receiving, by a processor, movement data from an IMU disposed in the input device, the movement data corresponding to and limited to 3-DOF movement of the input device in 3D space; controlling, by the processor, a movement of a cursor in the VR/AR environment based on the received movement data; and receiving, by the processor, first input data from a first input element on the input device indicating that the first input element is activated while the cursor is positioned in relation to a virtual object in the VR/AR environment. The method can further include selecting the virtual object in the VR/AR environment in response to the first input element being activated while the cursor is positioned in relation to the virtual object; moving the virtual object in the VR/AR environment within 3-DOF based on the detected 3-DOF movement of the input device while the first input element remains activated; receiving, by the processor, second input data from a second input element on the input device; and moving the virtual object in at least one additional DOF in the VR/AR environment based on the second input data while the first input element remains activated.

In some implementations, the selected virtual object in the VR/AR environment can be moved along a two-dimensional (2D) plane based on the detected movement of the input device while the first input element remains activated, and wherein the second input data causes the virtual object to move in a direction normal to the 2D plane. The first input element may be a button configured for binary operation including an activated and deactivated state, and the second input element may be a touch-sensitive touchpad separate and distinct from the first input element.

In further embodiments, a computer-implemented method of controlling a virtual object in a VR/AR environment can include receiving an input on an input device corresponding to a selection of the virtual object in the VR/AR environment; applying a first graphical modification to the virtual object in response to the selected object being manipulated by the input device to change its scale; and applying a second graphical modification to the virtual object in response to the selected object being manipulated by the input device to implement a push/pull function. In some cases, the first graphical modification can include highlighting the virtual object in the VR/AR environment. The second graphical modification may include highlighting the virtual object in the VR/AR environment. The method can further include applying a haptic feedback to the input device in response to the selected virtual object being manipulated by the input device to change its scale, where an intensity of the haptic feedback corresponds to the change of the scale of the input device. In some cases, the method can include applying a haptic feedback to the input device when the selected virtual object is manipulated by the input device to implement a push/pull function, wherein an intensity of the haptic feedback corresponds to the change of the distance of the input device with respect to a point of reference in the VR/AR environment.

In certain embodiments, a computer-implemented method of controlling a virtual object in an VR/AR environment includes receiving input data from an input device corresponding to a movement of a virtual object located within the VR/AR environment; receiving characterization data for the virtual object, the characterization data defining a virtual mass of the virtual object; moving the virtual object within the VR/AR environment based on a linear momentum curve in response to the virtual mass of the virtual object being below a threshold value; and moving the virtual object within the VR/AR environment based on a progressive momentum curve in response to the virtual mass of the virtual object being at or above the threshold value. The method can further include generating a haptic feedback on the input device while the virtual object is moved, where an intensity of the haptic feedback corresponds to the virtual mass of the virtual object. The haptic feedback may increase and decrease based on the linear momentum curve while the virtual mass of the virtual object is below the threshold value, and the haptic feedback can increase and decrease based on the progressive momentum curve while the virtual mass of the virtual object at or above the threshold value.

In some embodiments, a computer-implemented method of controlling a virtual object in an VR/AR environment includes receiving input data from an input device corresponding to a movement of a virtual object located within the VR/AR environment; determining a virtual distance of the virtual object from a user perspective; moving the virtual object within the VR/AR environment according to a first movement sensitivity setting while the virtual distance is below a threshold value; and moving the virtual object within the VR/AR environment according to a second movement sensitivity setting while the virtual distance is at or above the threshold value. In some cases, the first movement sensitivity and the second movement sensitivity are defined by a dots-per-inch (DPI) setting, wherein the first movement sensitivity has a first DPI setting, wherein the second movement sensitivity has a second DPI setting, and wherein the first DPI setting is lower than the second DPI setting.

In certain embodiments, a computer-implemented method of controlling a virtual object in a VR/AR environment includes receiving an input on an input device corresponding to a selection of the virtual object in the VR/AR environment; determining an object type of the virtual object; and applying a context-specific control schema to the virtual object, the control schema configured to control how a common set of input types affect the selected virtual object based on the object type of the virtual object. In some cases, in response to the object type corresponding to a text box, the method includes causing one or more of the common set of input types to control an entry of alphanumeric text into the text box.

In further embodiments, a computer-implemented method of operating the system according to claim 1 can include determining a first control schema for use across a VR/AR environment and a second control schema for interacting with a virtual object within the VR/AR environment; determining a first input received via an input device used for interfacing with the virtual object within the VR/AR environment; determining that a command for interfacing with the virtual object as a result of applying the second control schema to the first input to manipulate the virtual object differs from a corresponding command as a result of applying the first control schema to the first input to manipulate the virtual object; and in response to determining that the command as a result of applying the second control schemas differs from the corresponding command as a result of applying the first control schemas, applying one or more inputs to the second control schema to achieve a result of applying the first control schema to the first input to manipulate the virtual object.

BRIEF DESCRIPTION OF THE DRAWINGS

The detailed description is set forth with reference to the accompanying figures.

DETAILED DESCRIPTION

Figure 1:
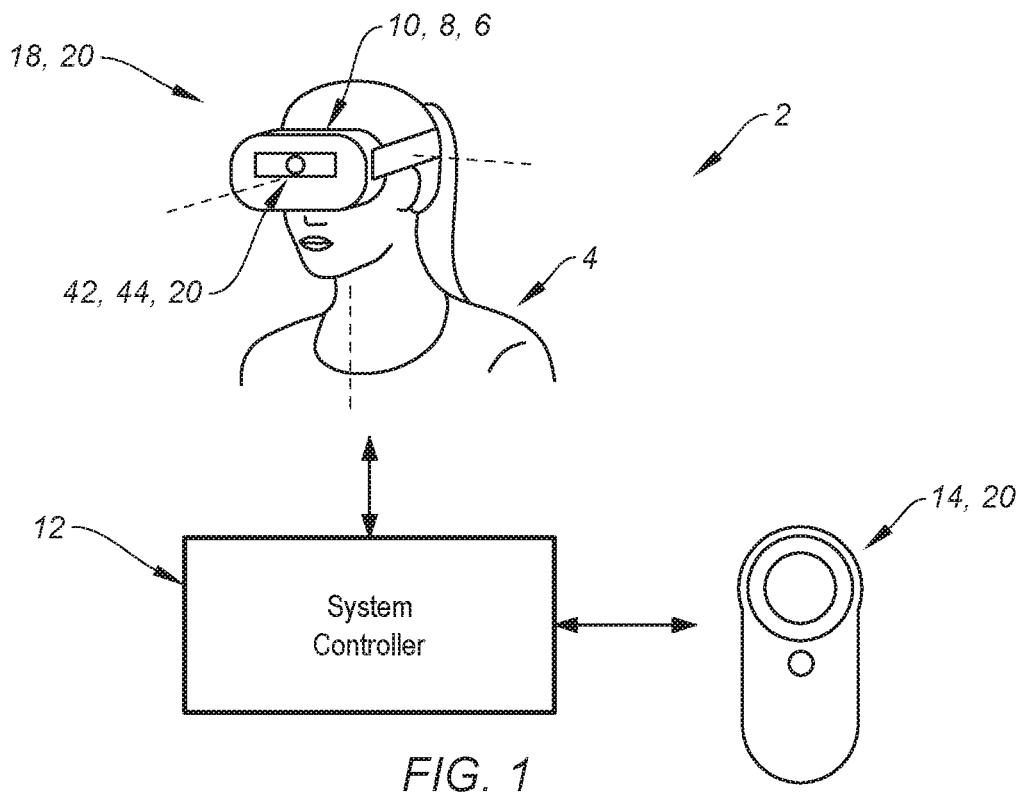
FIG. 1 is a schematic illustration of a virtual reality (VR) generation system 2, according to certain embodiments.

The described embodiments relate generally to virtual reality (VR) and augmented reality (AR) systems, and more specifically to input devices that operate within VR/AR environments.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Definitions

The present disclosure may be better understood in view of the following explanations:

As used herein, the terms "computer simulation" and "virtual reality environment" may refer to a virtual reality, augmented reality, real-reality or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-leaning simulation; or other like simulation. The simulated environment may be two or three-dimensional. As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment. As used herein, the terms "mixed reality" or "MR" may include use of virtual objects that are rendered as images in conjunction with a real-world view of an environment wherein the virtual objects can interact with the real world environment. Embodiments described below can be implemented in AR, VR, or MR.

As used herein, the term "real-world environment" or "real-world" may refer to the physical world. Hence, term "real-world arrangement" with respect to an object (e.g. a body part or user interface device) may refer to an arrangement of the object in the real-world and may be relative to a reference point. The term "arrangement" with respect to an object may refer to a position (location and orientation). Position can be defined in terms of a global or local coordinate system.

As used herein, the term "rendered images" or "graphical images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiment, the circuitry may include one or more virtual machines that can provide the described functionality. In certain embodiments, the circuitry may include passive components, e.g. combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor" or "host/local processor" or "processing resource" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device, which may include a user interface device and/or an HMD; a computer (e.g. a personal computer or like device); or other device in communication with a computer system.

As used herein, the term "computer readable medium/media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include: a modulated signal passed through a signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning input devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of a: camera system; a magnetic field based system; capacitive sensors; radar; acoustic; other suitable sensor configuration, optical, radio, magnetic, and inertial technologies, such as lighthouses, ultrasonic, IR/LEDs, SLAM tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); other device in communication with the system.

As used herein, the term "camera system" may refer to a system comprising a single instance or a plurality of cameras. The camera may comprise one or more of: a 2D camera; a 3D camera; an infrared (IR) camera; a time of flight (ToF) camera. The camera may include a complementary metal-oxide-semiconductor (CMOS), a charge-coupled device (CCD) image sensor, or any other form of optical sensor in use to form images. The camera may include an IR filter, which can be used for object tracking. The camera may include a red-green-blue (RGB) camera, which may be used for generation of real world images for augmented or mixed reality simulations. In an embodiment different frames of a single camera may be processed in an alternating manner, e.g., with an IR filter and for RGB, instead of separate cameras. Images of more than one camera may be stitched together to give a field of view equivalent to that of the user. A camera system may be arranged on any component of the system. In an embodiment the camera system is arranged on a headset or HMD, wherein a capture area of the camera system may record a field of view of a user. Additional cameras may be arranged elsewhere to track other parts of a body of a user. Use of additional camera(s) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. This can be an important aspect to ensure safe and pleasant use of VR. The camera system may provide information, which may include an image stream, to an application program, which may derive the position and orientation therefrom. The application program may implement known techniques for object tracking, such as feature extraction and identification. Examples include the speed-up robust features (SURF) algorithm. An example of a camera presently available is the Pro C920 or C930 Full HD by Logitech.

As used herein, the term "user interface device" may include various devices to interface a user with a computer, examples of which include: pointing devices including those based on motion of a physical device, such as a mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands.

As used herein, the term "input element" or "user interface" may refer to an object that the user interacts with to provide user input to a computer system. The input element or user interface may include a user manipulatable object, examples of which include: steering wheel; stick; pedal; mouse; keys; buttons; control pad; scroll wheel; flight yoke; light pen or other stylus device; glove, watch or other wearable device; rotational elements such as a dial or knob, motion detector; touch sensitive device. The user input element may be adapted to provide an input in other manners, including by the determination of a movement of a body part, including a touch pad.

As used herein, the term "totem" may, for example, include one or more physical or virtual objects which are manipulatable by the user to allow input or interaction with the AR, MR, or VR system. The totem may be used as a user interface device or a controller or as an object in virtual space. Some totems may take the form of inanimate objects, for example a piece of metal or plastic, a wall, a surface of table. Alternatively, some totems may take the form of animate objects, for example a hand of the user. The totems may not actually have any physical input structures (e.g., keys, triggers, joystick, trackball, rocker switch). Instead, the totem may simply provide a physical surface, and the AR, MR or VR system may render a user interface so as to appear to a user to be on one or more surfaces of the totem. For example, the AR, MR or VR system may render an image of a computer keyboard or trackpad to appear to reside on one or more surfaces of a totem. For instance, the AR system may render a virtual computer keyboard and virtual trackpad to appear on a surface of a thin rectangular plate of aluminum which serves as a totem. The rectangular plate may not itself have any physical keys or trackpad.

As used herein, the term "IMU" refers to an Inertial Measurement Unit which may measure movement in six Degrees of Freedom (6 DOF), along x, y, z Cartesian coordinates and rotation along 3 axes—pitch, roll and yaw. In some cases, certain implementations may utilize an IMU with movements detected in fewer than 6 DOF (e.g., 3 DOF as further discussed below).

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternately, the keyboard can be a virtual keyboard displayed in an AR/MR/VR environment.

As used herein, the term "fusion" may refer to combining different position-determination techniques and/or position-determination techniques using different coordinate systems to, for example, provide a more accurate position determination of an object. For example, data from an IMU and a camera tracking system, both tracking movement of the same object, can be fused. A fusion module as describe herein performs the fusion function using a fusion algorithm. The fusion module may also perform other functions, such as combining location or motion vectors from two different coordinate systems or measurement points to give an overall vector.

VR/AR System Overview

FIG. 1 is a schematic illustration of a virtual reality (VR) generation system 2, according to certain embodiments. The system 2 can be capable of generating a VR environment and displaying the environment to a user 4. System 2 can include a display 6 configured to provide a rendered environment 8 for the VR generation. Graphical environment 8 can include a graphical image 10. System 2 can further include system controller 12 in communication with display 6, which can be capable of generating and/or controlling graphical environment 8. System controller 12 may provide instructions to display 6, for example, by executing program code including an application program related to the VR/AR simulation. System 2 may further include one or a plurality of user interface devices 14, through which user 4 may interface with system controller 12. User input device 14 and display 6 may be embodied as peripheral devices 20, as further discussed below. In some embodiments, input device 14 (also referred to as an "interface device") can be a 3 DOF VR/AR interface, as further shown and discussed below at least with respect to FIGS. 5-13.

Display 6 may be embodied in head-mounted display (HMD) 18 that can include a video display, which may encompass part or all of a user's field of view and can present computer generated images of graphical environment 8. Display 6 may be driven by a display driver unit comprising one or more processors. Example embodiment HMDs may include a visor, helmet, goggles, glasses, or other similar interfaces. The HMD may further comprise any one or more of: headphones and/or speakers to provide auditory feedback, vibration means to provide vibration feedback (e.g., haptic feedback); and/or other sensors placed on or around the forward facing surface when in use.

Embodiments of a Computer System to Operate the HMD

Figure 2:
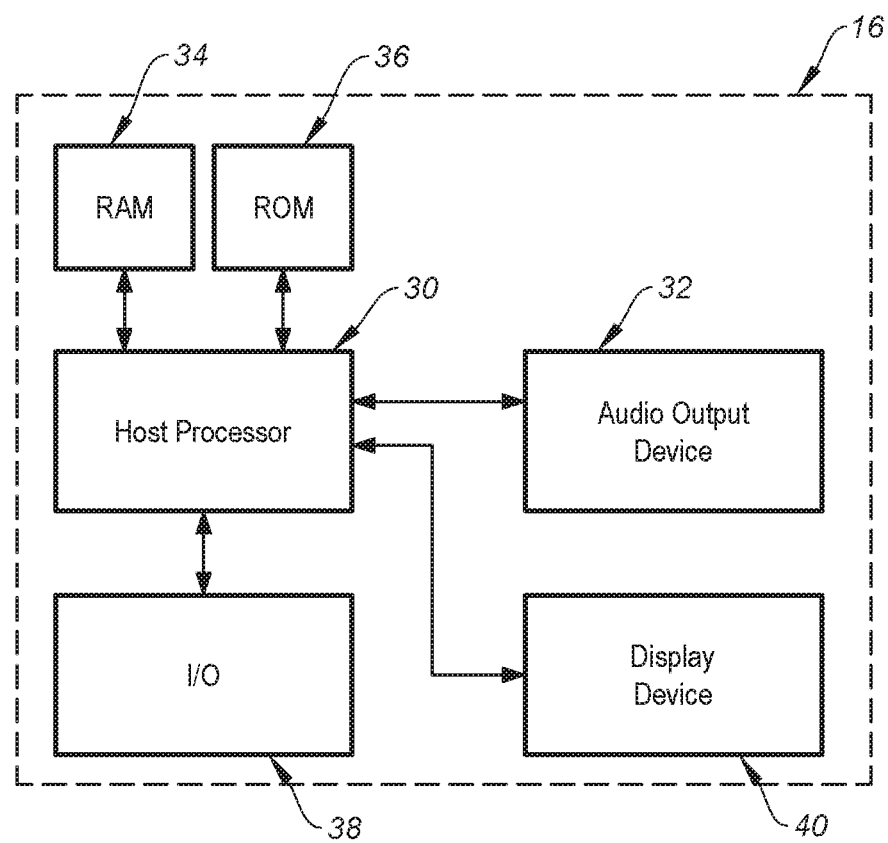
FIG. 2 shows a simplified block diagram of such a computer system, according to certain embodiments.

In some embodiments, system controller 12 may be a computer. FIG. 2 shows a simplified block diagram of such a computer system, according to certain embodiments. Computer 16 can comprise host processor 30, which may include a microprocessor, multiple processors and/or co-processor chips, and/or digital signal processor (DSP) capability, or the like. A system clock (not shown) may be coupled to or part of host processor 30 to provide timing data. Audio output device 32 such as a speaker, which is preferably coupled to host processor 30 via associated audio circuitry such as, but not limited to amplifiers, filters, and other circuitry known to the skilled person to provide sound output to user when an audio event occurs during the implementation of an application program. Audio output device 32 and associated circuitry may be disposed on or coupled to HMD 18. Display device 40 may display rendered images of a simulation, game environment, operating system application or other images associated with the simulation. Display device 40 may be part of HMD 18, forming (rendering)/displaying the virtual reality environment, or display device 40 may be a separate secondary display device to allow configuration of the system by the user without needing to wear the HMD, or configuration of the system by any other person, or to allow a secondary non-VR display of the virtual reality environment, e.g., for observation, run-time configuration, safety or any other purpose(s). Computer 16 may include other known components, such as random access memory (RAM) 34, read-only memory (ROM) 36, and input/output (I/O) system 38, as would be understood by one of ordinary skill in the art.

Computer 16 may implement an application program, which may be a simulation program for generation of the virtual reality environment. The user may interact with the program via said peripherals 20 (e.g., input device 14). The application program may include: a video game; an interactive digital location (e.g., home, virtual store, virtual sporting arena, etc.) a medical procedure simulation program such as a surgical or physiotherapy procedure; an interactive digital mock-up of a designed feature, such as a computer aided design; an educational simulation program, such as an E-leaning simulation; or other like simulation. The application program may comprise or access an external database, such as over a network. The application program may be implemented as one or more modules or other functional units. Herein, for simplicity, operating systems such as Windows™, Android; IOS; MS-DOS, MacOS, Linux, etc., are also referred to as application programs, as well as device drivers for hardware associated with the computer. Typically, application programs are capable of providing instructions for the generation of graphical environment 8 on display 6. It may thus provide images to be displayed on display 6 of HMD 18 and may output other feedback, such as auditory or vibration signals. The application program may be operable to check for input signals from peripherals 20 and provide the corresponding output. The application program may interface with HMD 18 and/or other peripherals 20 via a device driver, whereby the device driver communicates with the device through electronic circuitry of I/O system 38.

Computer 16, as described with reference to FIG. 2, may be embodied in a personal computer, workstation, laptop or server, such as a PC compatible computer, Apple® personal computer, or other workstation. Computer 16 may be operable under the Windows™, MacOS, Unix, or MS-DOS operating system or similar. In other embodiments, computer 16 can be a home video game console system, which is typically connected to a television set or other display. Examples include systems that are provided by Microsoft, Valve, HTC, Oculus, Nintendo, Sega, Sony, or other companies in the games console field. In other embodiments, computer 16 may be a set-top box, which can be used, for example, to provide interactive television functions to users, or a network or internet-computer, which can allow users to interact with a local or global network using standard connections and protocols, such as used for the Internet and World Wide Web. In some embodiments, computer 16 may comprise: a media player (such as an MP3 player); a subnotebook/netbook; a tablet computer; a smartphone; a cellular telephone; a personal digital assistant (PDA); other similar electronic device.

System 2 (e.g., system 300) may further comprise an object tracking system 42 for tracking of objects in the field of view of a user and for tracking of body parts of a user, such as one or more of a user's hands, arms, legs, feet, head, torso. The object tracking system 42 may be used to provide a real-time image stream to display 8 of HMD 18, for example an image stream depicting an avatar of a user and/or of other objects in the field of view of a user in the VR environment.

In some embodiments, object tracking system 42 may comprise camera system 44, such as one of more of a: 2D camera; a 3D camera; an IR camera; and/or a time of flight (ToF) camera. There may be a single instance of such a camera, or there may be a plurality of cameras. Camera system 44 may comprise complementary metal-oxide-semiconductor (CMOS) or charged-coupled device (CCD) image sensors, or any other form of sensor in use to generate/render images. Camera system 44 may include a camera with an IR filter, which can be used for object tracking. Camera system 44 may include an RGB camera, which can be used for the generation of mixed reality or augmented reality simulations. In some embodiments, different frames of a single camera may be processed in an alternating manner, e.g., with an IR filter and for RGB, instead of separate cameras. Images of more than one camera may be stitched together to give a field-of-view equivalent to that of the user. Camera system 44 may be mounted to or integrated as part of HMD 18, as illustrated in FIG. 1, or otherwise adapted to be worn on a head of a user, whereby the capture area of the camera can be arranged to record an equivalent to a field-of-view of a user when wearing the headset. Additional cameras may be arranged elsewhere to track other parts of a body of a user. Use of additional camera(s) to cover areas outside the immediate field of view of the user (or outside of field of view of other cameras within the system) may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. Computer 16 may implement an application program for determining (e.g., from the image stream provided by camera system 44) the arrangement of objects in the capture area. Such objects may comprise the aforesaid body parts, computer 16 and user input device 14. For object tracking the application program may implement known techniques, such as feature extraction and identification. In some embodiments, object tracking system 42 may comprise an ultrasonic, magnetic, or other field tracking devices, which may be mounted on the HMD (or other object to be tracked). Magnetic tracking devices, for instance, can sense a magnetic field generated from a local base station, video game console or other apparatus. The magnetic field tracker may provide information about the sensed magnetic field to an application program, which can derive the position and orientation of the magnetic field tracker, and thus the HMD, relative to a base station or the magnetic tracker from such information. Ultrasonic transducers can be used to track a location and/or orientation of an object relative to an HMD by taking advantage of a number of physical principles of ultrasonic waves including time-of-flight, Doppler shift, and signal attenuation. One of ordinary skill in the art with the benefit of this disclosure would understand the many variations, modifications, and alternative embodiments involving the use and integration of these (and other) sensor tracking systems.

User Interface Device

Figure 3:
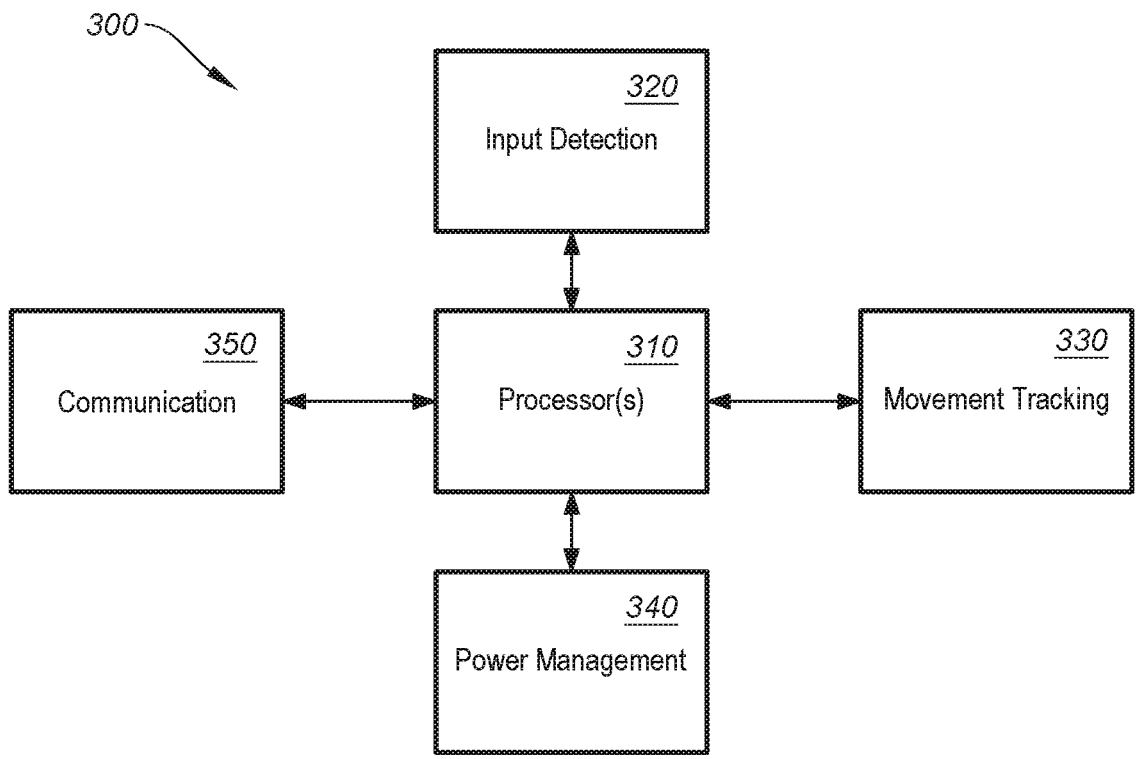
FIG. 3 shows a simplified block diagram of a system to operate an input device, according to certain embodiments.

FIG. 3 shows a simplified block diagram of a system 300 to operate input device 14, according to certain embodiments. System 300 may include processor(s) 310, input detection block 320, movement tracking block 330, power management block 340, and communication block 350. Each of system blocks 320-350 can be in electrical communication with processor 310. System 300 may further include additional systems that are not shown or described to prevent obfuscation of the novel features described herein.

In certain embodiments, processor(s) 210 may include one or more microprocessors (μCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 200. For example, communications block 250 may include a local processor to control communication with computer 110 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Figure 5:
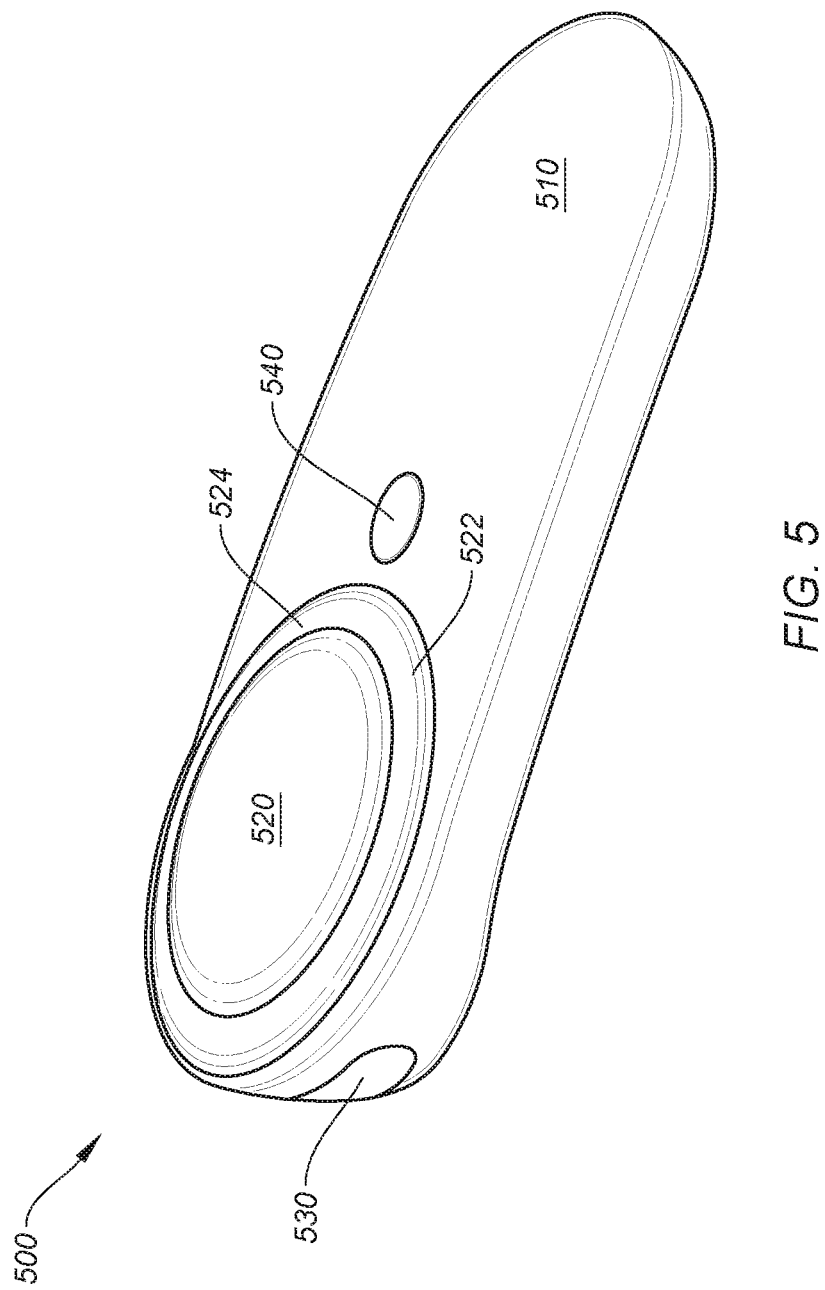
FIG. 5 shows an input device for interfacing with an VR/AR environment, according to certain embodiments.

Input detection block 320 can control the detection of button activation (e.g., main buttons, side buttons, a scroll wheel button, trigger button, etc.), scroll wheel and/or trackball manipulation (e.g., rotation detection), sliders, switches, touch sensors (e.g., one and/or two-dimensional touch pads, such as touch sensor 520), and the like. In some embodiments, input detection block 320 can detect when a key plate (e.g., trigger 530) is depressed with a sufficient force (e.g., a threshold force) such that it contacts and activates a force sensor (e.g., an actuator). The force sensor may generate a corresponding control signal (e.g., human interface device (HID) signal) to control a computing device (e.g., system controller 12) communicatively coupled to the input device (e.g., instantiating a "grab" function in an VR/AR environment). In some embodiments, input detection block 320 can control buttons 522, 524, 530, as shown in FIG. 5. Alternatively, the functions of input detection block 320 can be subsumed by processor 310, or in combination therewith. As illustrated, trigger 530 can be configured to be actuated by a finger of a user when holding input device 500 whereas touch sensor 520 can be operated by a thumb of a user. Trigger 530 and touch sensor 520 can be independently operated by different digits of a user while operation input device 500.

In some embodiments, input detection block 320 can detect a touch or touch gesture on one or more touch sensitive surfaces on input device 14 (see also FIG. 5). Input detection block 320 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 14 may or may not utilize touch detection or touch sensing capabilities. In some embodiments, input detection block 320 detects touch inputs on touch pad 520 of input device 500, as shown in FIG. 5.

In some aspects, input detection block 320 can control the operating of haptic devices implemented on an input device. For example, input signals generated by haptic devices can be received and processed by input detection block 320. For example, an input signal can be an input voltage, charge, or current generated by a piezoelectric device in response to receiving a force (e.g., user touch) on its surface. In some embodiments, input detection block 320 may control an output of one or more haptic devices on input device 14. For example, certain parameters that define characteristics of the haptic feedback can be controlled by input detection block 320. Some input and output parameters can include a press threshold, release threshold, feedback sharpness, feedback force amplitude, feedback duration, feedback frequency, over voltage (e.g., using different voltage levels at different stages), and feedback modulation over time. These characteristics are further described below. Alternatively, haptic input/output control can be performed by processor 310 or in combination therewith.

Input detection block 320 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Movement tracking block 330 can be configured to track a movement of input device 14 in 3D space. In certain embodiments, an inertial measurement unit (IMU) can be used for movement detection. IMUs may be comprised of one or more accelerometers, gyroscopes, or the like. Accelerometers can be electromechanical devices (e.g., microelectromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine a velocity, physical orientation, and acceleration of input device 14 in 3D space In some embodiments, gyroscope(s) can be used in lieu of or in conjunction with accelerometer(s) to determine movement or input device orientation in 3D space (e.g., as applied in an VR/AR environment). Any suitable type of IMU and any number of IMUs can be incorporated into input device 14, as would be understood by one of ordinary skill in the art.

Power management block 340 can be configured to manage power distribution, recharging, power efficiency, and the like, for input device 14. In some embodiments, power management block 340 can include a battery (not shown), a USB-based recharging system for the battery (not shown), and a power grid within system 300 to provide power to each subsystem (e.g., communications block 350, etc.). In certain embodiments, the functions provided by power management block 340 may be incorporated into processor(s) 310. Alternatively, some embodiments may not include a dedicated power management block. For example, functional aspects of power management block 340 may be subsumed by another block (e.g., processor(s) 310) or in combination therewith.

Communications block 350 can be configured to enable communication between input device 14 and system controller 12, or other devices and/or peripherals, according to certain embodiments. Communications block 350 can be configured to provide wireless connectivity (e.g., radio-frequency (RF), Bluetooth, BLE, infra-red (IR), ZigBee, Z-Wave, Logitech Unifying, or the like) to system controller 12 or other wireless devices. System 300 may include a hardwired connection to system controller 12 (e.g., USB, FireWire, etc.). For example, input device 14 can be configured to receive a Universal Serial Bus (USB) cable to enable bi-directional electronic communication with system controller 12 or other external devices. Some embodiments may utilize different types of cables or connection protocol standards to establish hardwired communication with other entities.

Although certain systems may not expressly discussed, they should be considered as part of system 300, as would be understood by one of ordinary skill in the art. For example, system 300 may include a bus system to transfer power and/or data to and from the different systems therein. In some embodiments, system 300 may include a storage subsystem (not shown). A storage subsystem can store one or more software programs to be executed by processors (e.g., in processor(s) 310). It should be understood that "software" can refer to sequences of instructions that, when executed by processing unit(s) (e.g., processors, processing devices, etc.), cause system 300 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 300 is meant to be illustrative and that many variations and modifications are possible, as would be appreciated by one of ordinary skill in the art. System 300 can include other functions or capabilities that are not specifically described here (e.g., mobile phone, global positioning system (GPS), power management, one or more cameras, various connection ports for connecting external devices or accessories, etc.). While system 300 is described with reference to particular blocks (e.g., input detection block 320), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 300 may be combined with or operated by other sub-systems as informed by design. For example, power management block 340 and/or movement tracking block 330 may be integrated with processor(s) 310 instead of functioning as a separate entity.

User interface devices 14 may not be limited to providing an input to said system controller 12, in embodiments they may also provide output to the user, e.g., in the form of visual or and/or haptic feedback, as further discussed below, at least with respect to FIGS. 9-10.

Figure 4:
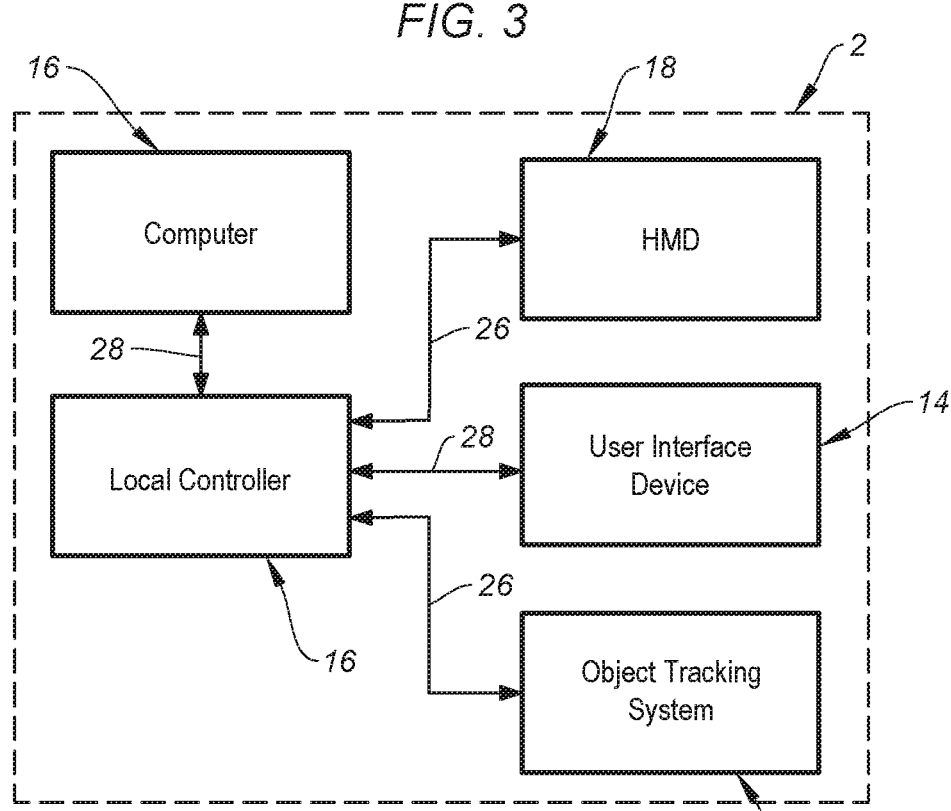
FIG. 4 shows a simplified block diagram of an implementation of a system to operate a VR/AR environment, according to certain embodiments.

FIG. 4 shows a simplified block diagram of an implementation of system 2 (see, e.g., FIG. 2) further including local controller 46, which can be connected to one or more of object tracking system 42, one or more user interface devices 14, HMD 18, or other devices of system 2. Local controller 46 may include a local processor, local memory and a communication interface; all of which may be configured as described with respect to user interface device 14. Local controller 46 may implement the described application programs associated with object tracking system 42 and/or user interface device 14. Alternatively or additionally, local controller 46 may be implemented in one of peripheral devices 20, such as the HMD 18 or user interface device 14, where local processor 22 of the peripheral 20 may be utilized as that of the local controller 46. One of ordinary skill in the art would understand the many variations, modifications, and alternative embodiments thereof.

FIG. 5 shows an input device 500 for interfacing within an VR/AR environment, according to certain embodiments. Input device 500 can include housing 510 with depressible touch-sensitive touch pad ("touch pad") 520, trigger button ("trigger") 530, home button 540, menu button 522, and media button 524. Touch pad 520 may detect touch inputs along a two-dimensional axis (e.g., along the surface of touch pad 520) and may be depressible to register a button click (an activation) when pressed. Touch pad 520 can be used to interface a VR/AR environment in a number a ways including object manipulation, text entry, navigation/selection (e.g., selecting icons or links on an application page in the VR/AR environment), and the like. Trigger button 530 may be used for object manipulation, selection, or other suitable functions, as further described below. Menu button 522 may prompt a user with a context-sensitive menu when activated. For example, pressing menu button 522 may launch an accessible menu in the VR/AR environment related to one or more active applications running the VR/AR environment (e.g., web browser and menu with corresponding web navigation functions), one or more previous actions (e.g., previously cutting/pasting in an email causes a menu with text editing functions to appear), or the like. Media button 524 may cause one or more media related interfaces to launch and be presented to a user in the VR/AR environment. For instance, pressing media button 524 may cause a suite of media transport controls to appear (e.g., play, pause, fast forward, rewind, etc.). In some embodiments, media button 524 may function alternatively or additionally to launch an internet-of-things ("IoT") interface. For example, pressing media button 524 may cause a menu to appear in the VR/AR environment that includes some or all of any IoT-enabled appliances or accessories in a locality and corresponding controls for each. Home button 540 may be cause an interface in a VR/AR environment to default to a particular menu, particular VR/AR environment conditions (e.g., location/orientation in VR/AR environment, removal of all open menus/applications in VR/AR environment, etc.).

In some embodiments, additional buttons can be included (e.g., scroll wheels, sliders, knobs, etc.) or some may be removed or implemented differently. For example, menu button 522 and media button 524 are shown on a bezel of touch sensor 520; they may be implemented at different locations on input device 500. One of ordinary skill in the art with the benefit of this disclosure would understand the many variations, modifications, and alternative embodiments for implementing the various buttons, touch sensors, and other possible interface elements.

Input device 500 can support 3D motion tracking for translating real-world movements in 3D space into corresponding movements in a VR/AR environment, as further discussed above at least with respect to FIGS. 1 and 3. In some embodiments, input device 500 can correspond to input device 14 of FIG. 1 and may be operated by system 300 of FIG. 3. In some cases, input device 500 may be a 3-DOF motion tracking controller. In order to achieve 6-DOF movement in a VR/AR environment, different combinations of inputs on input device 500 may be employed. For instance, combinations of inputs on touch sensor 520 and/or trigger 530, detected 3-DOF movements of input device 500 via one or more IMUs, etc., can be used to achieve 6-DOF movements and/or manipulations in a VR/AR environment. Some multi-input control schemes are described below and depicted at least in FIGS. 6-8.

In an exemplary embodiment, input device 500 can be used to interface within a VR/AR environment and may include an IMU configured to track a motion of the input device in 3D space, where the input device controls a movement of a cursor in the VR/AR environment based on the tracked motion of the input device in 3D space, and where the tracked motion of the input device in 3D space is limited to tracked motion having three degrees of freedom (3-DOF). Input device 500 may include a button configured to select a virtual object in the VR/AR environment in response to being activated while the cursor is positioned over the virtual object, where the input device moves the virtual object in the VR/AR environment based on the 3-DOF tracked motion of the input device while the button is being activated. For example, when the button is pressed, left/right movements may translate to movements of the virtual object in the VR/AR environment in a first direction (e.g., x-direction), up/down movements may translate to movements of the virtual object in a second direction (e.g., y-direction), and rotating the input device may translate into a rotation around a third direction (e.g., z-direction), as shown and described below with respect to FIG. 7.

In some cases, input device 500 can include an input interface (e.g., touch pad 520) configured to receive a user input and control the movement of the virtual object in the VR/AR environment in one or more additional DOF based on the received user input. For example, swiping the input interface in an up/down direction may translate into movement of the virtual object in the third direction. The button and input interface (and any other input element in input device 500) may be configured to independent and simultaneous operation. Thus, 3-DOF motion tracking, the button, and the input interface are operable, in combination, to manipulate a virtual object in the VR/AR environment in 6-DOF including movement along an x-plane, a y-plane, a z-plane, yaw, pitch, and roll. One or more processors (e.g., processor 310) may control the operation of the IMU, the button, and the input interface. In some embodiments, the input interface (touch pad 520) may be configured to multi-touch detection to support simultaneous touches on the touchpad where each touch is independently tracked. One of ordinary skill in the art would understand the many variations, modifications, and alternative embodiments thereof.

Figure 6A:
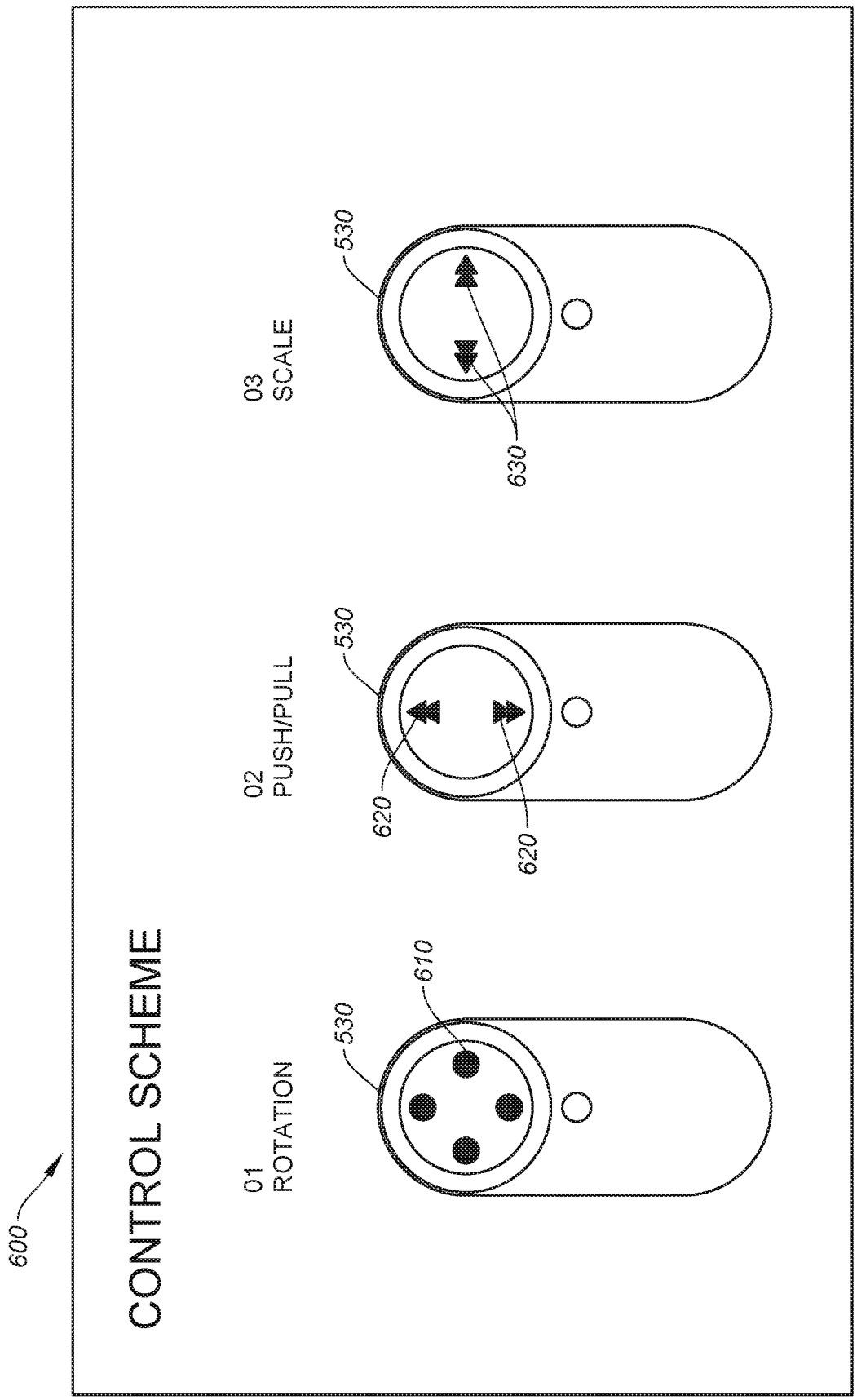
FIG. 6A shows various control schemes for manipulating a virtual object in a VR/AR environment using an input device, according to certain embodiments.

FIG. 6A shows various control schemes 600 for manipulating a virtual object in a VR/AR environment using input device 500, according to certain embodiments. These control schemes are intended to illustrate some of the possible combinations of inputs on input device 500 to perform certain functions in a VR/AR environment, but should not be construed as limiting. For example, the foregoing functions may be achieved using different combinations of inputs on input device 500, including input types (e.g., scroll wheels, sliders, etc.) not shown or described in detail, but however would be understood by one of ordinary skill in the art with the benefit of this disclosure.

Referring to FIG. 6A, input device 500 can include regions 610, 620, and 630 on touch sensor 520 that may function as individual buttons and perform different functions in certain settings. For example, to perform a rotation function on a virtual object, trigger 530 can be depressed while one of regions 610 is touched and/or depressed on touch pad 520 (e.g., when an interactive element such as a cursor is superimposed on the virtual object in the VR/AR environment). Trigger 530 may operate to select ("grab") the desired virtual object, while activating region 610 (or other regions on touch pad 520) may cause the selected virtual object to begin rotating in a particular direction.

In certain embodiments, touch pad 520 (or other inputs of input device 500) may operate differently depending on whether trigger 530 is actuated or not. For example, while trigger 530 is actuated and a cursor is used to select a virtual object, the object may be "grabbed" to be moved around a virtual environment. For example, the cursor may be positioned (in virtual space) over or in proximity to a virtual object and trigger 530 actuated to select the virtual object. While trigger 530 is depressed/actuated, touch pad 520 may be used to position the virtual object within the virtual environment. However, when cursor is positioned over or in proximity to the virtual object, touch pad 520 without trigger 530 being actuated, one or more context specific functions may operable via touch pad 520. For example, a speaker volume, text entry interface, text panning/scrolling, or other context specific functions may be available.

Using such a common schema to commonly move various types of virtual objects (e.g., pure objects (chairs, table, for example), IoT representative virtual objects (speakers, light switches, coffee makers, etc.), web browsers, and content specific window(s)) while allowing the same controls to be used to contextually interface with the various types of virtual objects. For example, certain virtual objects may have (possibly differing) object-specific controls associated with the object whereas others may be passive virtual objects without controls or user interactions beyond moving the object within the environment (or changing sizes, colors, etc.). Disclosed herein are techniques to commonly control different types of objects using a common control schema to increase user efficiency while operating within a virtual environment. In certain embodiments, certain movements that are allowable for an object depending on the type of object. For example, a web browser or other substantially 2D window within a 3D virtualized space may be limited from panning, yawing, and/or tiling to prevent the 2D window from being positioned in a manner that would make content of the window illegible, for example.

In certain configurations, a push/pull function can be performed on a virtual object in a similar manner. For instance, trigger 530 may be depressed to select or "grab" a desired virtual object in the VR/AR environment, while regions 620 can be touched or depressed to cause the selected virtual object to move closer or farther away from the user's location in the VR/AR environment. In some implementations, trigger 530 may be depressed and released while hovering over a virtual object, which thereby maintains the selection of the virtual object after trigger 530 is let go until trigger 530 is depressed again.

In some implementations, a scaling function can be performed on a virtual object by first selecting the virtual object via trigger 530, and pressing one of regions 630 to "scale" or resize the selected virtual object. For example, selecting the virtual object and pressing a first portion of region 630 can cause the selected virtual object to increase in size, while selecting the virtual object and pressing a second portion of region 630 can cause the selected virtual object to decrease in size. Some embodiments may employ different combinations of buttons, triggers, touch sensors and corresponding regions, etc., as would be understood by one of ordinary skill in the art.

Figure 6B:
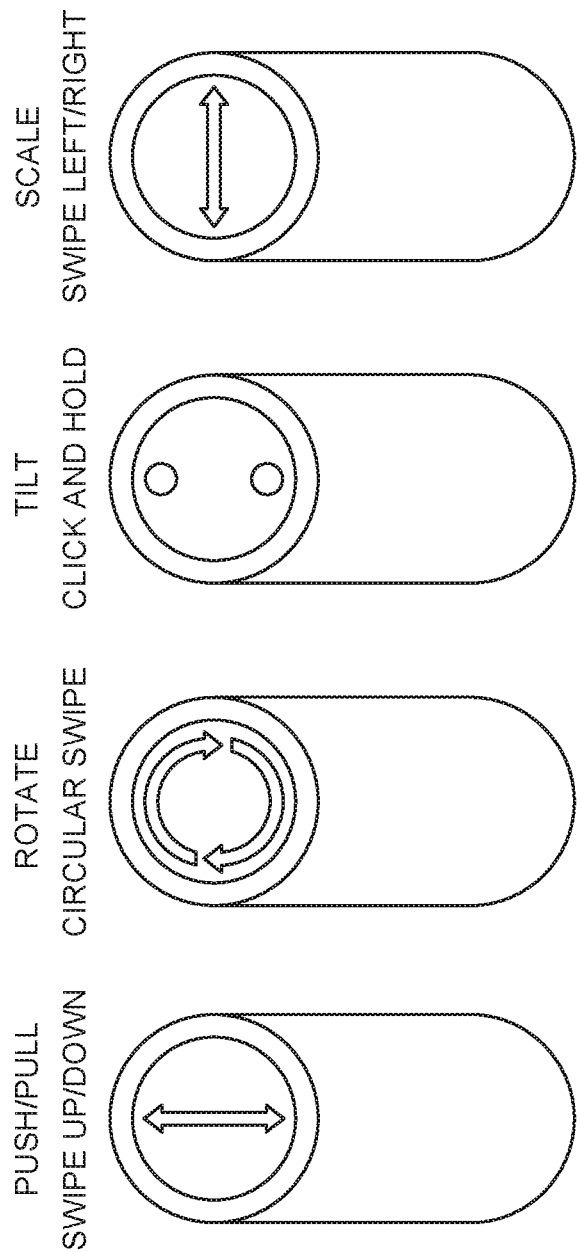
FIG. 6B shows a second set of various control schemes for manipulating a virtual object in a VR/AR environment using an input device, according to certain embodiments.

FIG. 6B shows a second set of various control schemes for manipulating a virtual object in a VR/AR environment using input device 500, according to certain embodiments. For instance, to perform a rotation function on a virtual object, a circular swipe can be performed on touch pad 520 (e.g., when an interactive element such as a cursor is superimposed on the virtual object in the VR/AR environment). In some cases, trigger 530 may need to be depressed (to grab the virtual object) before the circular swipe input on the touchpad 520 will rotate the virtual object. A clockwise circular swipe may cause clockwise rotation, counter-clockwise rotation, or the like.

In certain configurations, a push/pull function can be performed on a virtual object in a similar manner. For instance, trigger 530 may be depressed to select or "grab" a desired virtual object in the VR/AR environment, while swiping up/down initiates the push/pull function. In some embodiments, "grabbing" the object and swiping up may typically cause the virtual object to move away from the point-of-view of the user. Relatedly, grabbing and swiping down may cause the virtual object to move toward the point-of-view of the user.

In some implementations, a scaling function can be performed on a virtual object by first selecting the virtual object via trigger 530, and swiping left/right on touchpad 520 to "scale" or resize the selected virtual object. For example, selecting the virtual object and swiping right can cause the selected virtual object to increase in size, while selecting the virtual object and swiping left can cause the selected virtual object to decrease in size.

In some embodiments, a tilt function can be performed on a virtual object by first selecting the virtual object via trigger 530 and pressing (and possibly holding) a top button to tilt the virtual object upwards and a bottom button to tilt the virtual object downwards. Some embodiments may employ different combinations of buttons, triggers, touch sensors and corresponding regions, etc., as would be understood by one of ordinary skill in the art.

Tracking in 3-DOF Vs. 6-DOF

In 6-DOF tracking systems, both an orientation and position of a controller (input device) are detectable, such that very natural hand movements can be detected as one can move their hand in any direction in 3D space and in any orientation, which can be translated in kind in a corresponding VR/AR environment. In 3-DOF tracking systems, like those described herein (e.g., see FIG. 5) typically only rotational movements of the input device are detectable while translational movements may not be detectable. Thus, in some implementation, you may be able to point to something from a fixed point in virtual space, but you may not be able to directly grab it and manipulate it as you would with your hand (e.g., you may not map the input device's position to that of the virtual object). The 3-DOF embodiments provided in the present disclosure can provide for a more "direct" or "natural" control that is typically only achieved by 6-DOF input devices by providing a suite of input elements and controls to allow a user to scale a virtual object and translate/rotate movement along/around the x, y, z planes in an efficient, streamlined manner. Some of these control schemas are described at least with respect to FIGS. 6-8.

Figure 7:
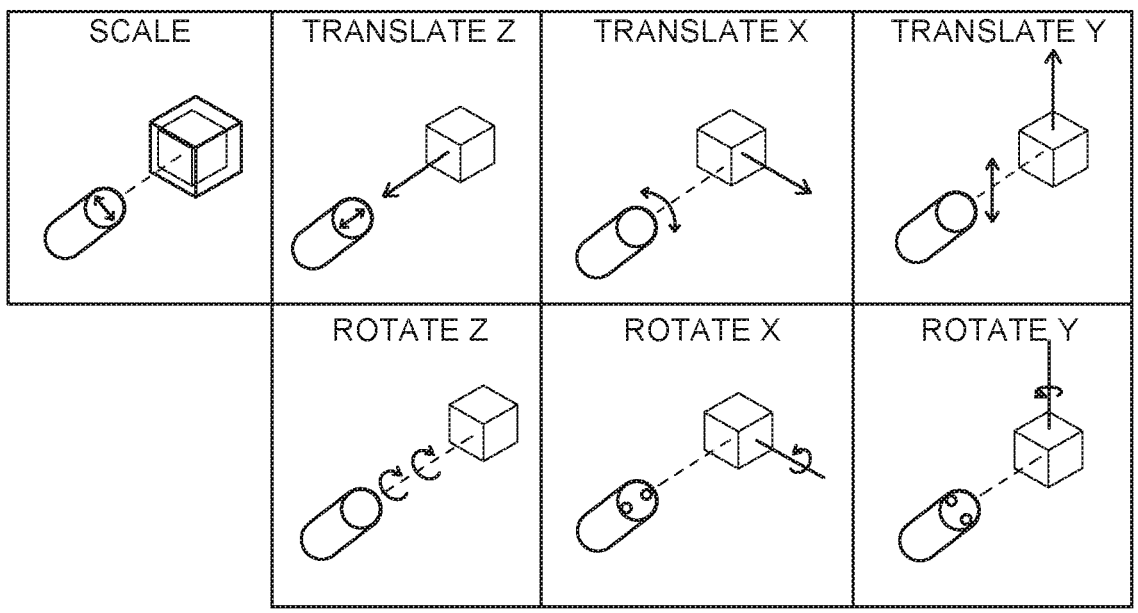
FIG. 7 shows various combinations of inputs on an input device using both IMU inputs and touch pad inputs to translate movement of a virtual object in a VR/AR environment, according to certain embodiments.

FIG. 7 shows various combinations of inputs 700 on input device 500 using IMU inputs, button ("trigger") 530 inputs, and touch pad 520 inputs to translate movement of a virtual object in a VR/AR environment, according to certain embodiments. For example, to translationally move a virtual object (e.g., application window, graphical icon, item (e.g., virtual table, ball, tool), menu, etc.), along an x-axis (using a typical Cartesian coordinate system in the VR/AR environment and a corresponding Cartesian coordinate system in the real world environment of the user operating input device 500), trigger 530 can be depressed to select ("grab") the virtual object, and input device 500 can be rotated around a y-axis (see FIG. 7). To translationally move the virtual object along the y-axis, trigger 530 can be depressed to grab the virtual object, and input device 500 can be moved rotationally around an x-axis. To translationally move the virtual object along the z-axis, trigger 530 can be depressed to grab the virtual object, and touch pad 520 can be swiped (e.g., up/down) to move the virtual object toward and away (along the z-axis) from the user.

Similarly, various combinations of inputs on input device 500 using IMU inputs, trigger 530 inputs, and touch pad 520 inputs to rotate a virtual object in a VR/AR environment are shown in FIG. 7, according to certain embodiments. For example, rotating a virtual object around the z-axis can be performed by selecting the virtual object via trigger 530 (e.g., when the cursor is hovering over the virtual object) and rotating input device 500 around the z-axis, as shown. Rotating the virtual object around the x-axis can be performed by selecting the virtual object via trigger 530 and pressing (and possibly holding) touch pad 520 at certain locations (e.g., "up" and "down" locations), as shown. Similarly, rotating the virtual object around the y-axis can be performed by selecting the virtual object via trigger 530 and pressing (and possibly holding) "right/left" locations on touch pad 520. FIGS. 6-7 illustrate certain exemplary embodiments that implement the translation and rotation of virtual objects in a VR/AR environment. One of ordinary skill in the art would understand the many variations, modifications, and alternative embodiments thereof.

Pressure Sensitive Touch Pad

In some cases, a user input on input device 500 may be limited to touches (presses) and touch swipes. As discussed above, to accommodate 6-DOF interactions, some embodiments employ taps (presses) for certain interactions like rotating a virtual object. However, such inputs may be binary in that the virtual object is rotating (at some rate) or not, without an effective way to dynamically control the rate of rotation. Thus, some embodiments may alternatively or additionally include a force-sensitive trackpad that can be used, for example, to control a rate of rotation of a virtual object based on an amount of pressure at a particular touch point on the touchpad. Any resolution (e.g., number of detectable pressure levels) can be used and the pressure sensitive touchpad may be applied to other control schemas, as would be understood by one of ordinary skill in the art with the benefit of this disclosure.

Alternative Control Schemas

Figure 8:
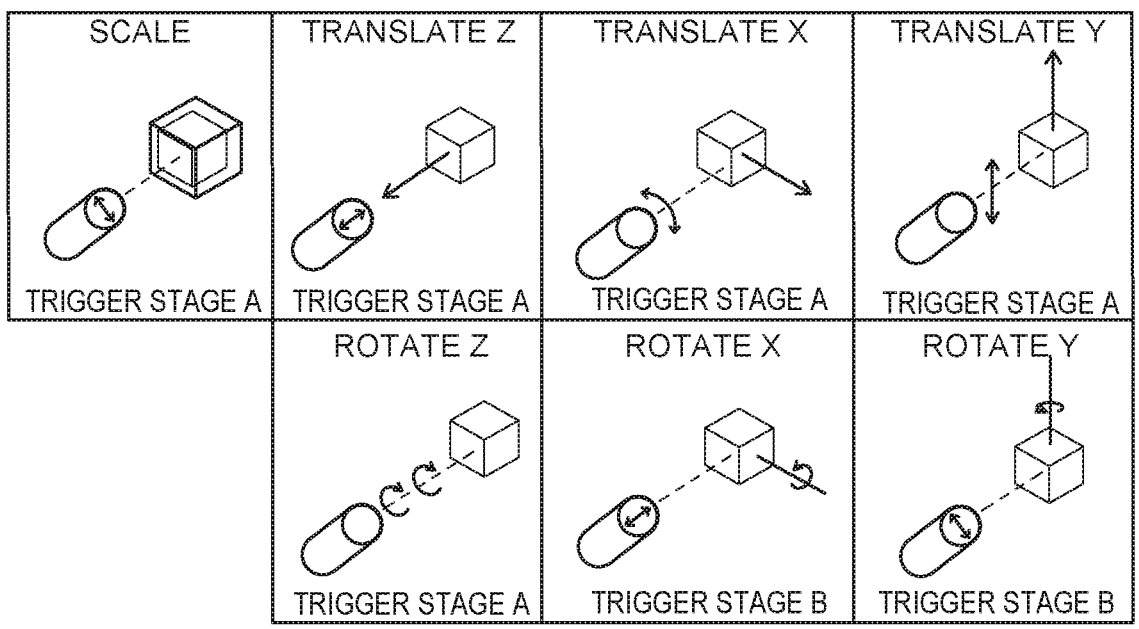
FIG. 8 shows various combinations of inputs on an input device using both IMU inputs and touch pad inputs to translate movement of a virtual object in a VR/AR environment, according to certain embodiments.

For some users, performing swipe gestures on the touchpad may be a preferable over press-and-hold schemes (as shown in FIG. 7). In such cases, trigger 530 may be configured for 3-state functionality, including an "off" condition (unpressed), a first trigger condition (e.g., a light press, a single press-and-hold, etc.), and a second trigger condition (e.g., a hard press, a double press-then-hold). A two stage trigger solution allows input device 500 to be configured such that the first trigger state maps the touchpad to push/pull and scale functions, and the second trigger state maps the touchpad to two-dimensional rotation functions. Referring to FIG. 8, the second trigger state allows for rotation around the x and y planes via a swipe gesture instead of a press-and-hold gesture, which may feel more intuitive to certain users. One of ordinary skill in the art would understand the many variations, modifications, and alternative embodiments thereof.

In addition to translating and rotating virtual objects, other complex movements and functions can be achieved with input device 500, even when limited to three DOF motion tracking. For example, input device 500 can be used to both select a virtual object, such as an application window in a VR/AR environment, and interface with the contents of the application window. In some implementations, trigger 530 can be activated (depressed) to select an application window in the VR/AR environment when a corresponding cursor is placed over the application window, and the application window can be moved within the VR/AR environment based on a tracked motion of the input device in 3D space while the application window remains selected. Furthermore, a user interface (e.g., touch pad 520) can be used to access and control content on the selected application window. Trigger button 530 and touch pad 520 can function independently of one another and support simultaneous operation. For example, a user can select and move an application window in a VR/AR environment while simultaneously interacting with content on the application window via touch pad 520.

Figure 9:
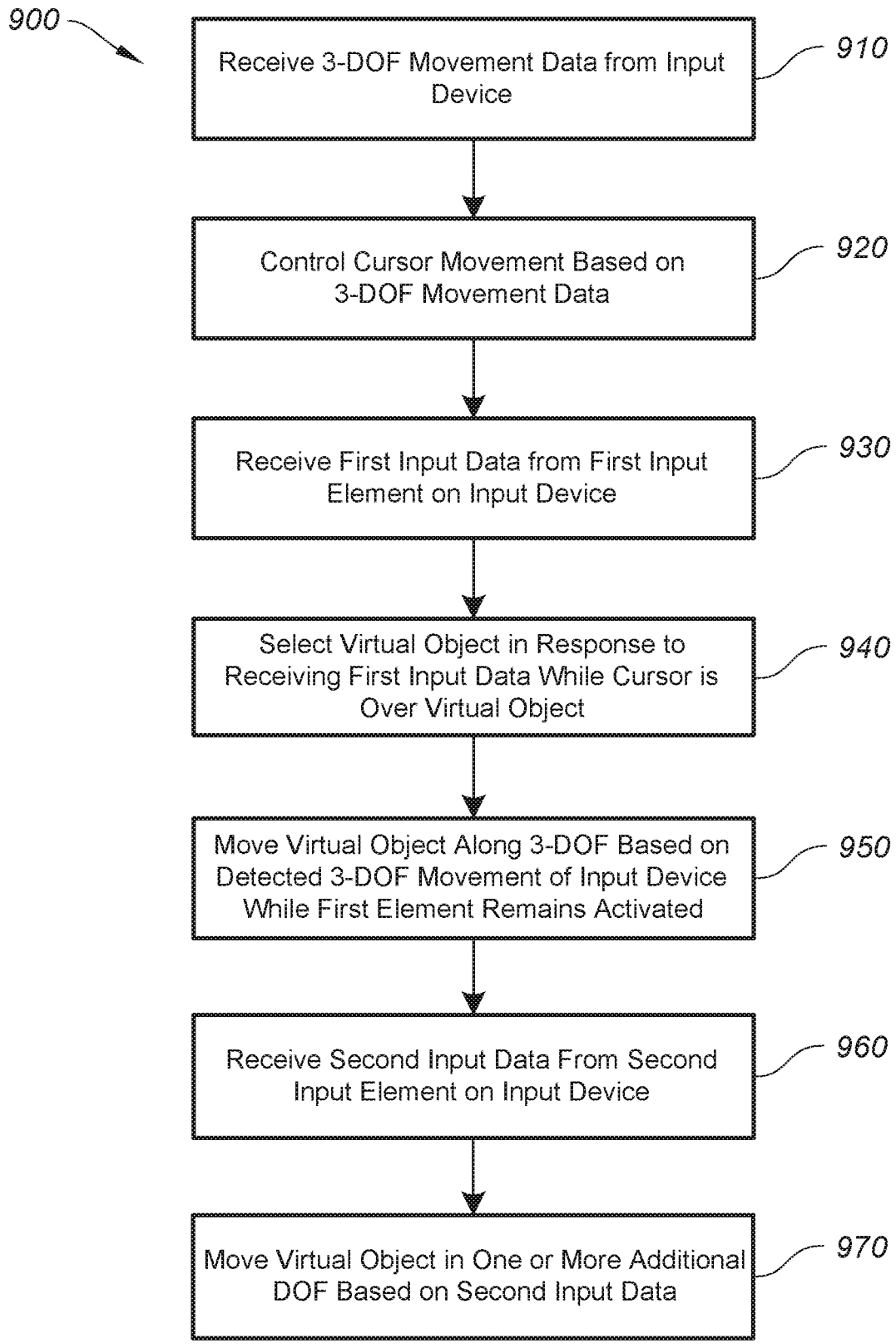
FIG. 9 is a simplified flow chart showing aspects of a method for controlling a virtual object in a VR/AR environment, according to certain embodiments

FIG. 9 is a simplified flow chart showing aspects of a method 900 for controlling a virtual object in a VR/AR environment, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by processor 310 of system 300, by resources of system controller 12, or a combination thereof.

At block 910, method 900 can include receiving movement data from an IMU disposed in input device 500, the movement data corresponding to and limited to a detected 3-DOF movement of the input device in 3D space. The IMU may include one or more accelerometers or other sensors to detect an orientation of the controller, a location of the controller, or a combination thereof (e.g., as describe above with respect to FIGS. 6-8). In certain embodiments, the IMU may be configured to only detect 3-DOF rotational movements of input device 500 and/or translational movements of input device 500 detected by the IMU may be dismissed. As disclosed herein, IMUs (especially those utilizing accelerometers) may suffer from drift when attempting to determine an absolution location of the IMU. By limiting detection to 3-DOF rotational movements, undesirable effects of drift can be minimized (e.g., inaccurate location determination, inadvertent movements of a cursor in a virtual environment, etc.).

At block 920, method 900 can include controlling a movement of a cursor in the VR/AR environment based on the received movement data. The cursor may be moved along an x/y plane from the viewpoint of a user viewing a VR/AR environment, for example, in response to detecting rotational movement of the input device along x and y axes (similar to x and y translational movements of an object as illustrated in FIG. 7).

At block 930, method 900 can include receiving first input data from a first input element on the input device indicating that the first input element is activated while the cursor is positioned over a virtual object in the VR/AR environment. The first input element can be a button (e.g., trigger 530), however other types of input elements are possible (e.g., touch sensitive elements, scroll wheels, sliders, pressure sensors, etc.).

At block 940, method 900 can include selecting the virtual object in the VR/AR environment in response to the first input element being activated while the cursor is positioned over the virtual object. Any virtual object can be selected including interactive windows (e.g., web browser), 3D objects (e.g., virtual table, virtual IoT controller, virtual speaker, etc.), or any other user accessible object in a VR/AR environment.

At block 950, method 900 can include moving the virtual object in the VR/AR environment 3-DOF based on the detected 3-DOF movement of the input device while the first input element remains activated. For example, 3-DOF rotational movements of an input device can be mapped to moving a virtual object translationally along an x-axis, y-axis, and rotationally along a z-axis, as illustrated in FIG. 7.

At block 960, method 900 can include receiving, by the processor, second input data from a second input element on the input device. The second input element may be a touchpad (e.g., touchpad 520), however other types of second input elements may be used (e.g., buttons, button arrays, sliders, scroll wheels, pressure sensors, etc.).

At block 970, method 900 can include moving the virtual object in at least one additional DOF in the VR/AR environment based on the second input data while the first input element remains activated. As indicated above, moving the virtual object based solely on the physical movement of the input device may control the virtual object over 3-DOF, however additional inputs (e.g., from the second input element) may introduce additional degrees-of-freedom, as shown and described with respect to FIGS. 6-8. In one example, the selected virtual object in the VR/AR environment can be moved along a two-dimensional (2D) plane based on the detected movement of the input device while the first input element remains activated, and the second input data may causes the virtual object to move in a direction normal to the 2D plane. In particular embodiments, the first input element can be a button configured for binary operation including an activated and deactivated state, and the second input element may be a touch-sensitive touchpad separate and distinct from the first input element.

It should be appreciated that the specific steps illustrated in FIG. 9 provide a particular method 900 for controlling a virtual object in a VR/AR environment, according to certain embodiments. Other sequences of steps may also be performed according to alternative embodiments. Furthermore, additional steps may be added or removed depending on the particular applications. For example, some embodiments may not apply a graphical modification to a push/pull modification, but may apply one to a scaling modification. Any combination of changes can be used and one of ordinary skill in the art with the benefit of this disclosure would understand the many variations, modifications, and alternative embodiments thereof.

In a VR/AR environment, scaling a virtual object (e.g., changing a size of the virtual object) and pushing/pulling a virtual object may appear visually to a user to have identical results. For instance, increasing the size of a virtual object at a distance from a user in the VR/AR environment may look the same as moving the virtual object closer to the user; in both cases the virtual object increases in size. One solution to this problem is provided in method 1000 of FIG. 10.

Figure 10:
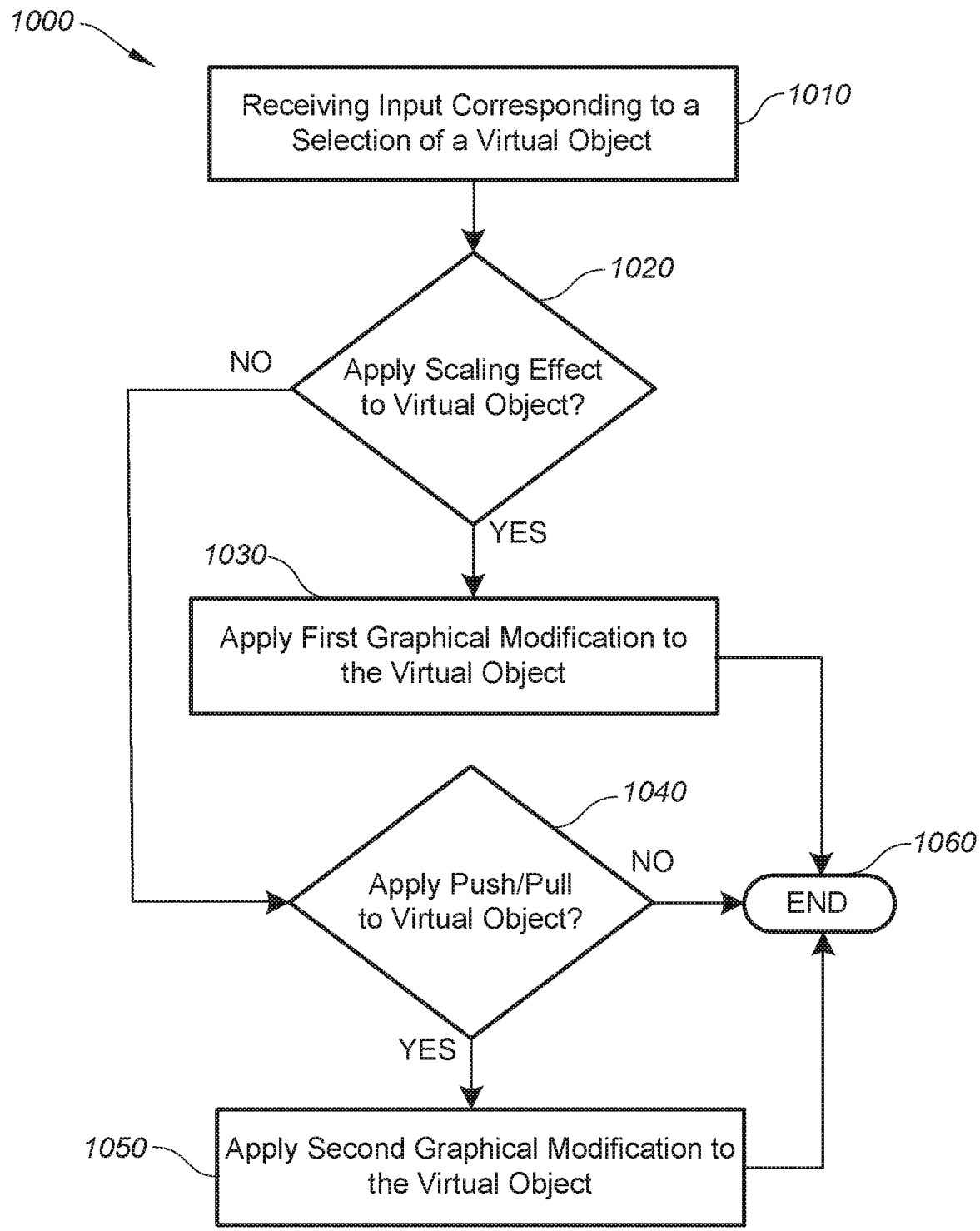
FIG. 10 is a simplified flow chart showing aspects of a method for controlling a virtual object in a VR/AR environment, according to certain embodiments.

FIG. 10 is a simplified flow chart showing aspects of a method 1000 for controlling a virtual object in a VR/AR environment, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by processor 310 of system 300, by resources of system controller 12, or a combination thereof.

At step 1010, method 1000 can include receiving an input from input device 500 corresponding to a selection of a virtual object in a VR/AR environment. For example, using input device 500, a user may move a cursor over the virtual object in the VR/AR environment and select the virtual object by pressing trigger 530.

At step 1020, method 1000 can include determining whether a subsequent input corresponds to an application of a scaling effect on the virtual object. For instance, the subsequent input may or may not correspond to changing the size of the virtual object in the VR/AR environment. In response to the selected object being manipulated by input device 500 to change the scale of the virtual object, method 1000 can further include applying a first graphical modification to the virtual object (step 1030) while it is being scaled. The first graphical modification may include highlighting the selected virtual object (e.g., the virtual object can appear to glow). In certain embodiments, the first graphical modification can be ghost image of the object (e.g., an outline of the shape of the object applied over an image of the object at its beginning size) and may be differently colored to respectively indicate whether the virtual object is enlarged or shrunk. Alternatively or additionally, a haptic feedback can be applied to input device 500 when the selected object is manipulated by the input device to change its scale (step 1020). At step 1020, when the subsequent input does not correspond to the application of a scaling, method 1000 continues to step 1040.

At step 1040, method 1000 can include determining whether a subsequent input corresponds to an application of a push/pull action on the virtual object. For instance, the subsequent input may or may not correspond to moving the virtual object in the VR/AR environment closer or farther away from the user. In response to the selected object being manipulated by input device 500 to apply a push/pull action to the virtual object, method 1000 further includes applying a second graphical modification to the virtual object (step 1050) while it is being pushed or pulled. The second graphical modification may include highlighting the selected virtual object (e.g., the virtual object can appear to glow). In some embodiments, the first graphical modification can be different than the second graphical modification (e.g., different highlighting patterns, different brightness/color, etc.). In some cases, a graphical modification may only be applied to one action (e.g., scaling), but not the other. Alternatively or additionally, a haptic feedback can be applied to input device 500 when the selected object is manipulated by the input device to perform a push/pull action (step 1040).

It should be appreciated that the specific steps illustrated in FIG. 10 provide a particular method 1000 for controlling a virtual object in a VR/AR environment, according to certain embodiments. Other sequences of steps may also be performed according to alternative embodiments. Furthermore, additional steps may be added or removed depending on the particular applications. For example, some embodiments may not apply a graphical modification to a push/pull modification, but may apply one to a scaling modification. Any combination of changes can be used and one of ordinary skill in the art with the benefit of this disclosure would understand the many variations, modifications, and alternative embodiments thereof.

Figure 11:
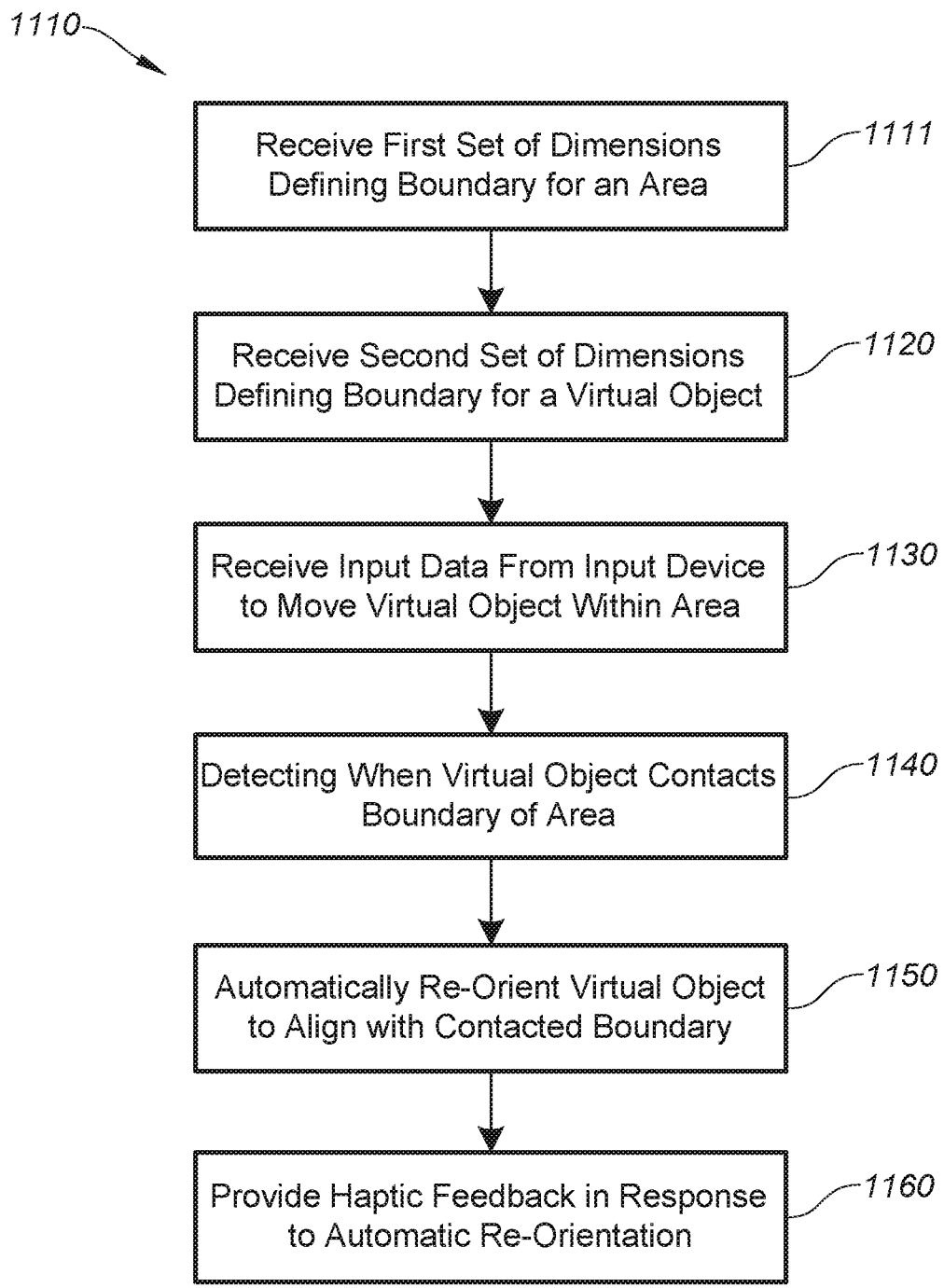
FIG. 11 is a simplified flow chart showing aspects of a method for controlling a virtual object in a VR/AR environment, according to certain embodiments.

FIG. 11 is a simplified flow chart showing aspects of a method 1100 for controlling a virtual object in a VR/AR environment, according to certain embodiments. Method 1100 can be performed by processing logic that may comprise hardware, software operating on appropriate hardware, firmware, or any combination thereof, as described above with respect to FIG. 1-4. In certain embodiments, method 1100 can be performed by processor 310 of system 300, by resources of system controller 12, or a combination thereof.

At step 1110, method 1100 can include receiving a first set of dimensions defining a boundary for an area in the VR/AR environment. For instance, the area can be a room, one or more walls, obstructions, or other virtual objects existing in a VR/AR environment. The first set of dimensions can correspond to the various contours, planes, etc., defining the area. For example, the first set of dimensions may include a height, length, and width of a number of walls defining a room that a user is interacting with in a VR/AR environment.

At step 1120, method 1100 can include receiving a second set of dimensions defining a boundary for a virtual object located in the area of the VR/AR environment. For example, the second set of dimensions can define the metes and bounds of the various contours defining the virtual object.

At step 1130, method 1100 can include receiving input data from an input device to move the virtual object within the area in the VR/AR environment. For example, the input data can correspond to a combination of inputs including selecting the virtual object via trigger 530 and moving the selected virtual object within the defined area.

At step 1140, method 1100 can include detecting when the virtual object contacts the boundary of the area in the VR/AR environment. For example, contact can be detected when any portion of the virtual object (e.g., a corner, protrusion, etc.) contacts the boundary (e.g., one wall of a number of walls defining the boundary).

At step 1150, method 1100 can include automatically re-orienting the virtual object to align with an orientation of the contacted boundary in response to detecting that the virtual object contacts the boundary of the area. For instance, when a corner or plane defining a portion of the virtual object comes into contact with a boundary of the area, the virtual object can "snap" to a new orientation to align with the boundary. For a more concrete example, if a virtual box was moved within a bounded rectangular virtual area and a corner of the virtual box contacted a wall within the bounded rectangular area, the virtual box would "snap" to a new orientation such that a plane of the virtual box would be co-planar or in planar alignment with the contacted wall. In some cases, the reorientation automatically occurs and prevents clipping between the virtual object and the contacted boundary. In some cases, the automatic re-orienting of the virtual object can cause a surface of the virtual object to align with a plane defining the contacted boundary.

At step 1160, method 1100 can include providing a haptic feedback on the input device in response to the automatic reorientation of the virtual object. For instance, when a virtual object comes into contact with a boundary of the area, the user may experience a physical vibration on input device 500. In some cases, the intensity of the haptic feedback may correspond to the amount of contact between the virtual object and the boundary, a momentum and corresponding mass of the virtual object and/or the boundary, or other suitable criteria, as would be understood by one of ordinary skill in the art.

It should be appreciated that the specific steps illustrated in FIG. 11 provide a particular method 1100 for controlling a virtual object in a VR/AR environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 12:
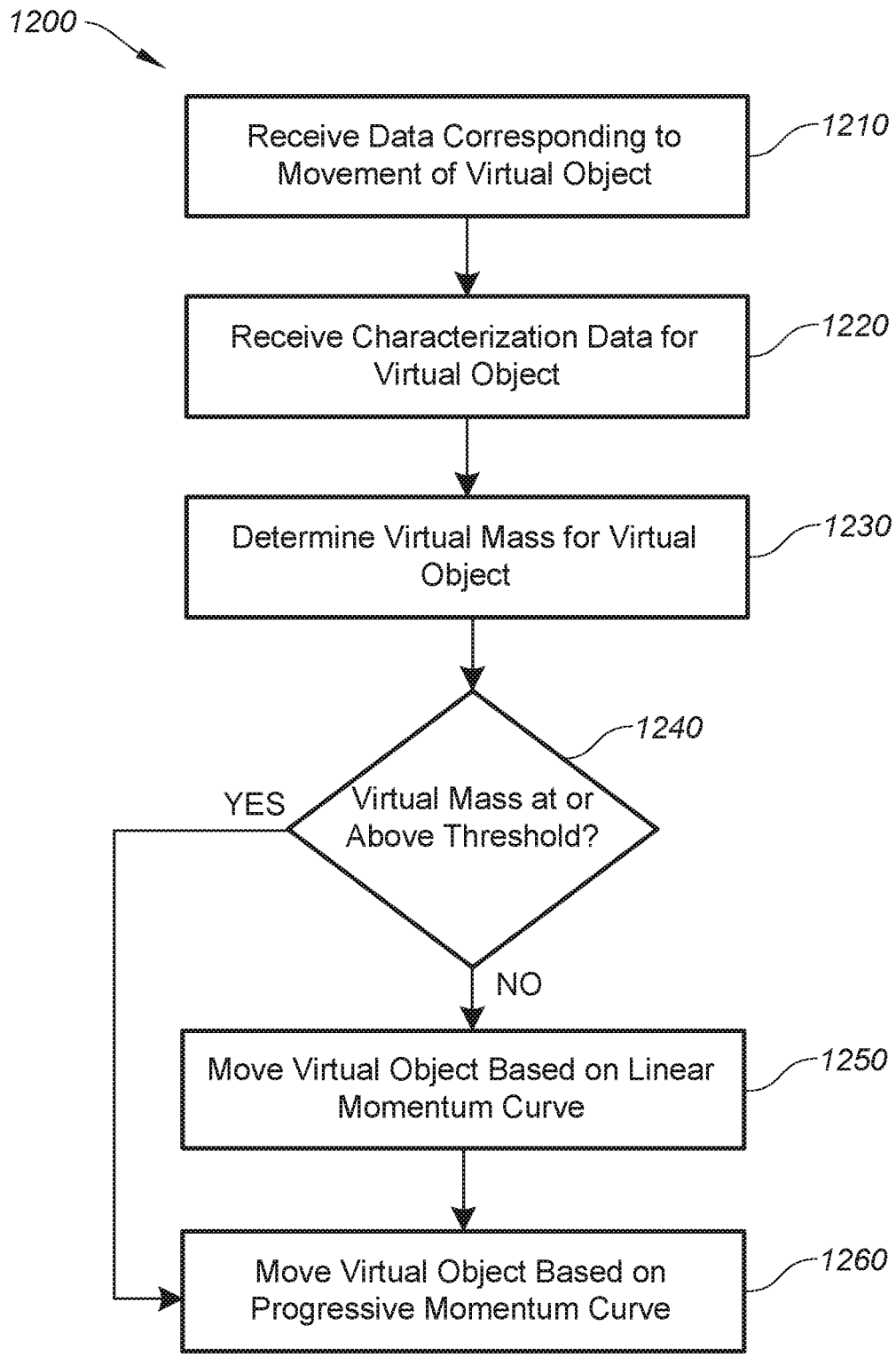
FIG. 12 is a simplified flow chart showing aspects of a method for controlling a virtual object in a VR/AR environment, according to certain embodiments.

FIG. 12 is a simplified flow chart showing aspects of a method 1200 for controlling a virtual object in a VR/AR environment, according to certain embodiments. Method 1200 can be performed by processing logic that may comprise hardware, software operating on appropriate hardware, firmware, or any combination thereof, as described above with respect to FIGS. 1-4.

In certain embodiments, method 1200 can be performed by processor 310 of system 300, by resources of system controller 12, or a combination thereof.

At step 1210, method 1200 can include receiving input data from input device 500 corresponding to a movement of a virtual object located within the VR/AR environment. In some embodiments, the virtual object may be moved via input device 500 based on one or more corresponding inputs. For example, the virtual object may be moved in response to trigger button 530 being depressed and one or more IMUs detect corresponding movement of input device 500.

At step 1220, method 1200 can include receiving characterization data for the virtual object. Characterization data can include any type of information including a color, surface texture attributes, boundary data (e.g., data defining the shape, size, contours, etc., of the virtual object), light reflecting/absorption properties, a virtual mass of the virtual object, and the like, as would be understood by one of ordinary skill in the art.

At step 1230, method 1200 can include determining a virtual mass of the virtual object based on the characterization data. The virtual mass can be used to control how the virtual object is moved within the VR/AR environment. Any suitable range and assigned values can be used, as would be understood by one of ordinary skill in the art. For example, a scale of 1-100 can be used to define a virtual mass with zero being effectively weightless in the VR/AR environment, and 100 being the maximum value (e.g., an immovable virtual object, such as a wall or building). Using this scale, a table may have a virtual mass of 30, while a small handheld speaker may have a virtual mass of 5. These values merely illustrate one non-limiting way of defining a virtual mass within an VR/AR environment, and other ranges, limits, and assigned values are possible.

At step 1240, method 1200 can include determining whether the virtual mass of the virtual object as at or above a threshold value. For example, the threshold value may be 40, which can define what may be considered "heavy" (virtual mass values at or over 40) or "light" (virtual mass under 40) in the VR/AR environment. Any suitable threshold value (or multiple values) can be used.

At step 1250, method 1200 can include moving the virtual object within the VR/AR environment based on a linear momentum curve when the virtual mass of the virtual object is below a threshold value. Different momentum curves can change how the virtual object appears to move in 3D space. In some embodiments, a linear momentum curve can be applied to virtual objects having a virtual mass below a threshold value to give the appearance that the virtual object is "light" and easily moved around the VR/AR environment. For example, if the virtual object is a shoe with a virtual mass of 10, then a linear momentum curve is applied as 10 is less than the threshold value (e.g., threshold value=40). In effect, it can appear that the shoe is easily moved in the VR/AR environment with a relatively small discernable amount of momentum.

At step 1260, method 1200 can include moving the virtual object within the VR/AR environment based on a progressive momentum curve when the virtual mass of the virtual object is at or above the threshold value. In some embodiments, a progressive momentum curve can be applied to virtual objects having a virtual mass at or above a threshold value to give the appearance that the virtual object is "heavy" and moved more sluggishly around the VR/AR environment. For example, if the virtual object is a couch with a virtual mass of 50, then a progressive momentum curve is applied as 50 is greater than the threshold value (e.g., threshold value=40). In effect, it can appear that the couch is easily moved in the VR/AR environment with a relatively large discernable amount of momentum.

In some embodiments, method 1200 can further include generating a haptic feedback on the input device when the virtual object is moved based on the virtual mass of the virtual object. The haptic feedback may increase and decrease based on the linear momentum curve when the virtual mass of the virtual object is below the threshold value. In some cases, the haptic feedback increases and decreases based on the progressive momentum curve when the virtual mass of the virtual object at or above the threshold value.

It should be appreciated that the specific steps illustrated in FIG. 12 provide a particular method 1200 for controlling a virtual object in a VR/AR environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 13:
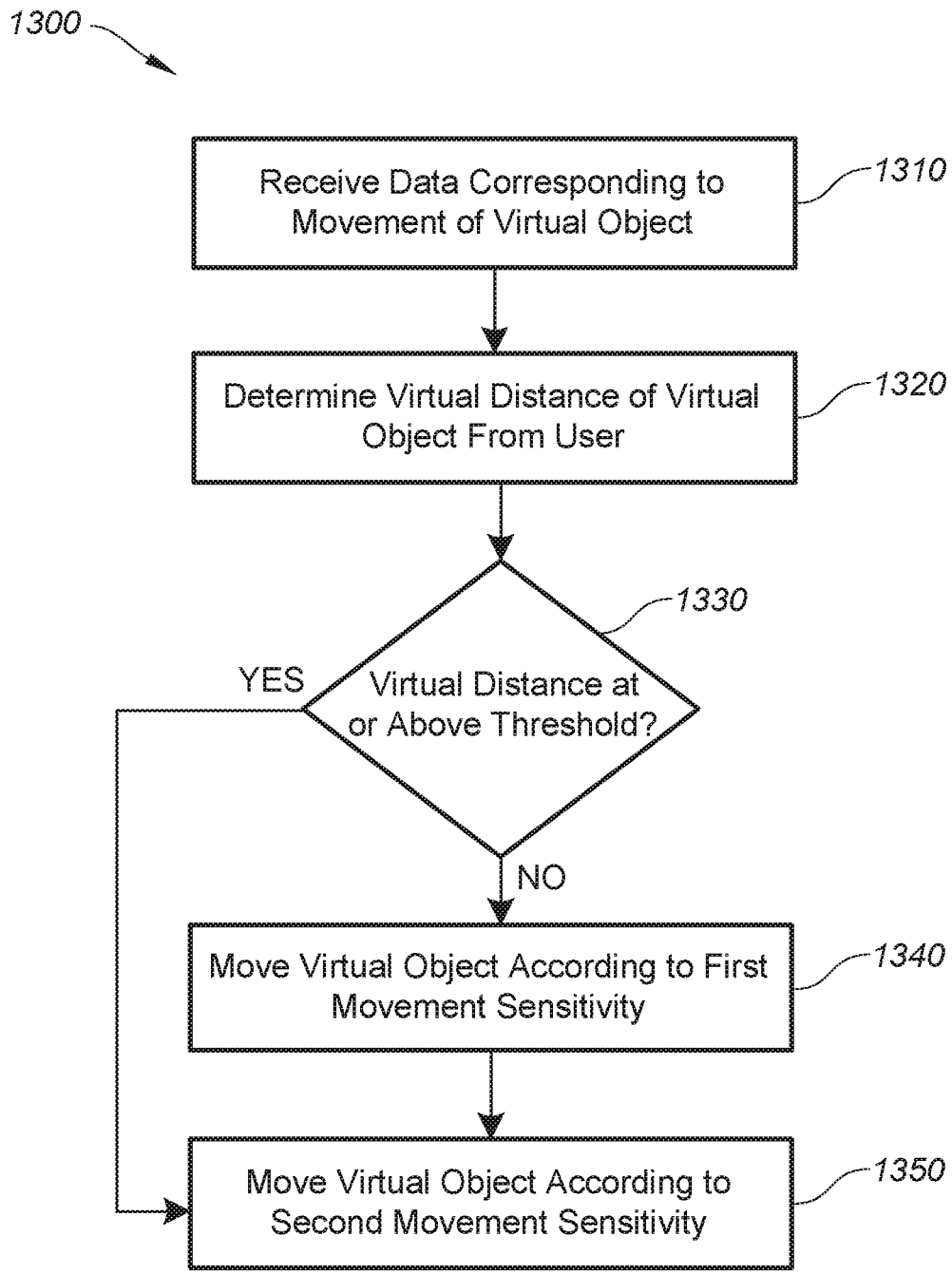
FIG. 13 is a simplified flow chart showing aspects of a method for controlling a virtual object in a VR/AR environment, according to certain embodiments.

FIG. 13 is a simplified flow chart showing aspects of a method 1300 for controlling a virtual object in a VR/AR environment, according to certain embodiments. Method 1300 can be performed by processing logic that may comprise hardware, software operating on appropriate hardware, firmware, or any combination thereof, as described above with respect to FIGS. 1-4. In certain embodiments, method 1300 can be performed by processor 310 of system 300, by resources of system controller 12, or a combination thereof.

At step 1310, method 1300 can include receiving input data from an input device corresponding to a movement of a virtual object located within the VR/AR environment. In some embodiments, the virtual object may be moved via input device 500 based on one or more corresponding inputs. For example, the virtual object may be moved when trigger button 530 is depressed and one or more IMUs detect corresponding movement of input device 500.

At step 1320, method 1300 can include determining a virtual distance of the virtual object from a user perspective. For example, the virtual object may appear to be far (e.g., 100 m away in the VR/AR environment) or close (e.g., 3 m away). Any suitable coordinate system can be used for measuring virtual distance.

At step 1330, method 1300 can include determining whether the virtual distance of the virtual object is below a threshold virtual distance or at/above the threshold distance. At step 1340, method 1300 can include moving the virtual object within the VR/AR environment according to a first movement sensitivity setting when the virtual distance is below a threshold value. At step 1350, method 1300 can include moving the virtual object within the VR/AR environment according to a second movement sensitivity setting when the virtual distance is at or above the threshold value. In some embodiments, the first movement sensitivity and the second movement sensitivity can be defined by a dots-per-inch (DPI) setting. For instance, the first movement sensitivity can have a first DPI setting, the second movement sensitivity can have a second DPI setting, where the first DPI setting is lower than the second DPI setting. This can give the appearance that items closer to the user move in the foreground faster and objects further from the viewer move in the background slower. In alternative embodiments, instead of one or more thresholds, a continuous adjustment of the DPI can be a function of a distance between a user (at the HMD) and the input device. Thus, a more analogue "feel" may result as the DPI dynamically adapts to match a set perceived sensitivity by the user.

It should be appreciated that the specific steps illustrated in FIG. 13 provide a particular method 1300 for controlling a virtual object in a VR/AR environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, different control schemas may be used to control particular functions in different applications. For instance, a first application operating within a VR/AR environment may include a first control schema to control a particular function (e.g., x/y movement controlled via a swipe command), while a second application may include a second control schema (e.g., x/y movement is controlled by movement of the input device in an x/y direction) to control the same function. Some embodiments can unify differing control schemas by converting common input commands (e.g., see FIGS. 7-8) into particular commands of a particular application such that a user may not have to adapt to different control schemas; instead, a single set of interactions may be adapted to accommodate many differing types of control schemas to control a function, all the while being transparent from the user perspective.

Figure 14:
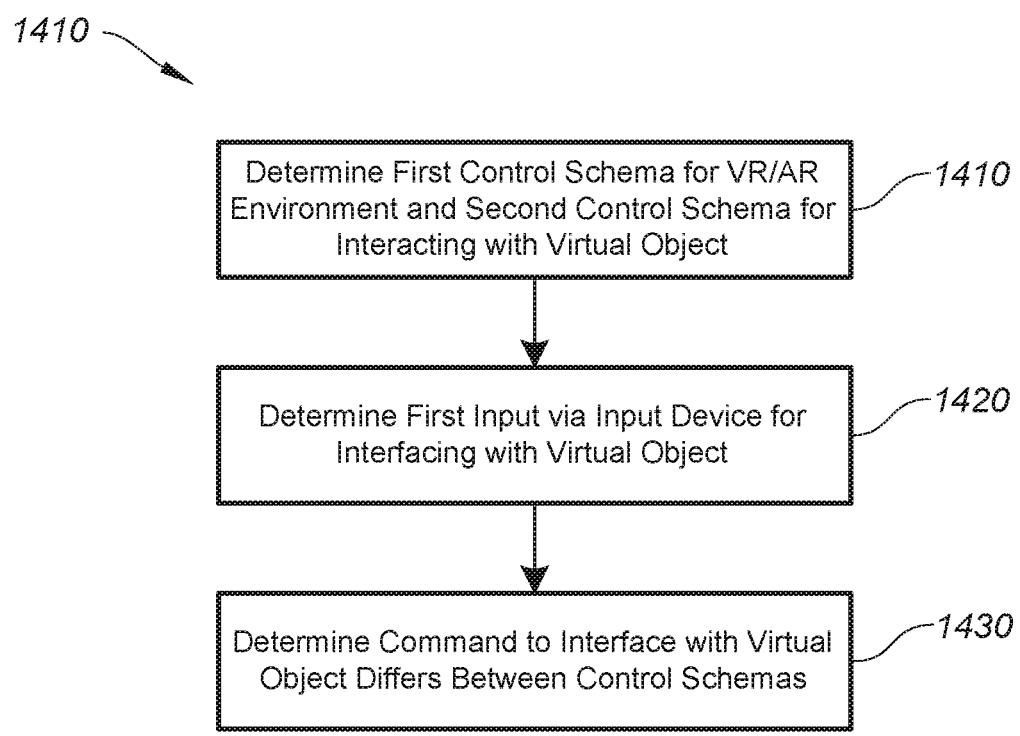
FIG. 14 is a simplified flow chart showing aspects of a method 1400 for converting standard inputs in an input device into a particular inputs configured to control aspects of an application operating in a VR/AR environment, according to certain embodiments.

FIG. 14 is a simplified flow chart showing aspects of a method 1400 for converting standard inputs in an input device into a particular inputs configured to control aspects of an application operating in a VR/AR environment, according to certain embodiments. A VR/AR environment can be implemented in several manners. For example, a VR/AR environment can be implemented wherein several VR/AR applications reside within or are accessed via a host VR/AR application. For example, a common VR/AR host can present a unified operating environment to a user that may categorize or otherwise enable access to other, third party applications. Control of virtual objects within the VR/AR environment may be inconsistent across these third party applications. Method 1400 can provide a more consistent user interface experience utilizing the control schemas provided herein. Method 1400 can be implemented by a VR/AR host or a third party application, for example.

Method 1400 can be performed by processing logic that may comprise hardware, software operating on appropriate hardware, firmware, or any combination thereof, as described above with respect to FIGS. 1-4. In certain embodiments, method 1400 can be performed by processor 310 of system 300, by resources of system controller 12, or a combination thereof.

At step 1410, method 1400 can include determining that a specific control schema for moving and/or interfacing differs from an established common control schema using an input device. The difference in control schemas can be, for example, due to a third party application implementing control(s) differently than a control schema disclosed herein for use with input device 500. For example, designers of the third party application may not have considered functionality of input device 500. The differences in control schemas can include, for example, determining input(s) used to translationally move or rotate and object, for example. The differences may also be applied within a common application or environment for controlling different virtual objects (e.g., a virtual object representing a web browser may be controlled differently than a virtual object representing a couch).

At step 1420, method 1400 can include receiving a first input on the input device while interfacing with the VR/AR environment corresponding to a first command (e.g., moving a virtual object, rotating a virtual object, etc.) of the common control schema.

At step 1430, method 1400 can include translating the first input to a set of inputs for the specific control schema to achieve the desired command of the common control schema. For example, detected input(s) corresponding to a panning motion can be translated to inputs that would achieve a similar panning motion using the specific control schema. Thus, a user can be presented with a common control schema across different application or platforms that may each include differing control schemas.

It should be appreciated that the specific steps illustrated in FIG. 14 provide a particular method 1400 for controlling a virtual object in a VR/AR environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system including:
an input device for interfacing within a virtual reality or augmented reality (VR/AR) environment, the input device comprising:
an inertial motion unit (IMU) configured to track a motion of the input device in three-dimensional (3D) space;
a button;
a touch-sensitive input interface configured to detect touch-based inputs; and
a non-transitory computer-readable medium storing instructions that, when executed by a processor, configures the processor to:
control movement of a cursor in the VR/AR environment based on the tracked motion of the input device in 3D space, wherein the movement of the cursor is limited to a tracked movement of the input device in three degrees of freedom (3-DOF);
in response to moving a position of the cursor via the 3-DOF tracked movement to a location of a virtual object and an actuation of the button, select the virtual object;
while the virtual object is selected:
move the virtual object in the VR/AR environment according to the 3-DOF tracked motion of the input device; and
control movement of the virtual object in the VR/AR environment in an additional 3-DOF based on a user's touch-based input detected via the touch-sensitive input interface, the additional 3-DOF being different than the 3-DOF for the tracked motion of the input device.

2. The system of claim 1 wherein the button and the input interface are configured for independent and simultaneous operation.

3. The system of claim 1 wherein the 3-DOF tracked movement, the button, and the input interface are operable, in combination, to manipulate a virtual object in the VR/AR environment in 6-DOF including movement along an x-axis, a y-axis, a z-axis, yaw, pitch, and roll.

4. A computer-implemented method for operating an input device in a VR/AR environment, the method comprising:
- receiving, by a processor, movement data from an IMU disposed in the input device, the movement data corresponding to and limited to 3-DOF movement of the input device in 3D space;
- controlling, by the processor, a movement of a cursor in the VR/AR environment based on the received movement data;
- receiving, by the processor, first input data from a first input element on the input device indicating that the first input element is activated while the cursor is positioned in relation to a virtual object in the VR/AR environment;
- selecting the virtual object in the VR/AR environment in response to the first input element being activated while the cursor is positioned in relation to the virtual object;
- moving the virtual object in the VR/AR environment within a first 3-DOF based on the detected 3-DOF movement of the input device while the first input element remains activated;
- receiving, by the processor, second input data from a second input element on the input device; and
- moving the virtual object in an additional 3-DOF in the VR/AR environment based on the second input data while the first input element remains activated, the additional 3-DOF being different than the first 3-DOF.

5. The computer-implemented method of claim 4 wherein the selected virtual object in the VR/AR environment is moved along a two-dimensional (2D) plane based on the detected 3-DOF movement of the input device while the first input element remains activated, and wherein the second input data causes the virtual object to move in a direction normal to the 2D plane.

6. The computer-implemented method of claim 4 wherein the first input element is a button configured for binary operation including an activated and deactivated state, and wherein the second input element is a touch-sensitive touchpad separate and distinct from the first input element configured to detect touch-based inputs on the touchpad.

* * * * *